(12) United States Patent
Lai et al.

(10) Patent No.: US 12,197,955 B2
(45) Date of Patent: Jan. 14, 2025

(54) HETEROGENEOUS SCHEDULING FOR SEQUENTIAL COMPUTE DAG

(71) Applicant: Huawei Technologies Co., Ltd., Shenzhen (CN)

(72) Inventors: Shouwen Lai, San Diego, CA (US); Guofang Jiao, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 825 days.

(21) Appl. No.: 17/275,039

(22) PCT Filed: Apr. 28, 2019

(86) PCT No.: PCT/CN2019/084742
§ 371 (c)(1),
(2) Date: Mar. 10, 2021

(87) PCT Pub. No.: WO2020/052241
PCT Pub. Date: Mar. 19, 2020

(65) Prior Publication Data
US 2022/0043688 A1 Feb. 10, 2022

Related U.S. Application Data

(60) Provisional application No. 62/729,646, filed on Sep. 11, 2018.

(51) Int. Cl.
*G06F 9/46* (2006.01)
*G06F 9/48* (2006.01)
(Continued)

(52) U.S. Cl.
CPC .......... *G06F 9/5038* (2013.01); *G06F 9/4881* (2013.01); *G06F 9/5055* (2013.01); *G06F 9/5066* (2013.01); *G06N 7/01* (2023.01)

(58) Field of Classification Search
CPC .................................................. G06F 9/5038
(Continued)

(56) References Cited

U.S. PATENT DOCUMENTS 9,348,560 B2 * 5/2016 Xie ..................... G06F 9/5044
9,607,355 B2 * 3/2017 Zou ....................... G06F 9/522
(Continued)

FOREIGN PATENT DOCUMENTS

WO 2017163591 A1 9/2017

OTHER PUBLICATIONS

Choi, J. et al., "A Cpu-Gpu Hybrid Implementation and Model-Driven Scheduling of the Fast Multipole Method", Mar. 1, 2014, 8 pages.

(Continued)

*Primary Examiner* — Mehran Kamran
(74) *Attorney, Agent, or Firm* — Slater Matsil, LLP

(57) ABSTRACT

Embodiments of this disclosure provide techniques for splitting a DAG computation model and constructing sub-DAG computation models for inter-node parallel processing. In particular, a method is provided where a plurality of processors split the DAG computation into a plurality of non-interdependent sub-nodes within each respective node of the DAG computation model. The plurality of processors includes at least two different processing unit types. The plurality of processors construct a plurality of sub-DAG computations, each sub-DAG computation including at least a non-interdependent sub-node from different nodes of the DAG computation. The plurality of processors process each of the plurality of sub-DAG computations in parallel.

39 Claims, 9 Drawing Sheets

(51) Int. Cl.
  *G06F 9/50* (2006.01)
  *G06N 7/01* (2023.01)
(58) Field of Classification Search
  USPC .......................................................... 718/104
  See application file for complete search history.

(56) References Cited

U.S. PATENT DOCUMENTS

| | | | |
|---|---|---|---|
| 9,818,166 B2* | 11/2017 | Taylor | G06T 1/20 |
| 10,452,449 B1* | 10/2019 | Verplaetse | G06F 9/5044 |
| 11,416,262 B1* | 8/2022 | Bornhoevd | G06F 16/283 |
| 2012/0229827 A1* | 9/2012 | Zolnay | H04N 1/6063 |
| | | | 358/1.9 |
| 2013/0298130 A1* | 11/2013 | Pienaar | G06F 9/4887 |
| | | | 718/102 |
| 2014/0029610 A1* | 1/2014 | Vasseur | H04L 45/22 |
| | | | 370/389 |
| 2015/0261580 A1* | 9/2015 | Shau | H04L 67/10 |
| | | | 718/106 |
| 2016/0098662 A1* | 4/2016 | Voss | G06Q 10/06316 |
| | | | 705/7.26 |
| 2016/0110228 A1* | 4/2016 | Zhang | G06F 9/5083 |
| | | | 718/104 |
| 2016/0291942 A1* | 10/2016 | Hutchison | G06F 8/311 |
| 2017/0039239 A1* | 2/2017 | Saadat-Panah | H04L 67/1023 |
| 2017/0046106 A1* | 2/2017 | Kobayashi | G06F 3/1213 |
| 2017/0177312 A1* | 6/2017 | Boehm | G06F 8/41 |
| 2017/0212781 A1* | 7/2017 | Dillenberger | G06F 9/5038 |
| 2017/0213089 A1* | 7/2017 | Chen | G06V 20/10 |
| 2017/0220697 A1* | 8/2017 | Wan | H04L 45/02 |
| 2017/0249218 A1* | 8/2017 | Falkinder | G06F 11/1453 |
| 2017/0249716 A1* | 8/2017 | Meixner | G06F 8/447 |
| 2018/0032568 A1* | 2/2018 | Pal | G06Q 50/01 |
| 2018/0075098 A1* | 3/2018 | Yin | G06F 16/24561 |
| 2018/0329958 A1* | 11/2018 | Choudhury | G06F 16/2456 |
| 2018/0330258 A1* | 11/2018 | Harris | G06N 7/01 |
| 2018/0365059 A1* | 12/2018 | Nagao | G06F 9/50 |
| 2018/0373540 A1* | 12/2018 | Bao | G06F 9/5038 |
| 2019/0205746 A1* | 7/2019 | Nurvitadhi | G06N 3/044 |
| 2019/0303474 A1* | 10/2019 | Pragada | G06F 16/24542 |
| 2019/0361407 A1* | 11/2019 | Vogel | G01R 22/10 |
| 2019/0391791 A1* | 12/2019 | Bebee | G06F 8/71 |
| 2020/0401429 A1* | 12/2020 | Chambers | G06F 9/3885 |
| 2022/0043688 A1* | 2/2022 | Lai | G06F 17/10 |

OTHER PUBLICATIONS

Li, Xia, "Task Scheduling Computation Research Based on Heterogeneous Multi-Core Processor Groups," Application of Computer Technology, May 3, 2016, 8 pages.
Malony, A. et al., "Parallel Performance Measurement of Heterogeneous Parallel Systems with GPUs," 2011 International Conference on Parallel Processing, Sep. 13-16, 2011, pp. 176-185.
Nersc, "Programming Models," http://www.nersc.gov/users/computational-systems/cori/programming/programming-models/, Sep. 11, 2018, 2 pages.
Wu, W. et al., "Hierarchical DAG Scheduling for Hybrid Distributed Systems", Dec. 16, 2014, 11 pages.
Intel, "Allegorithmic Substance, Threaded Middleware", http://de.slideshare.net/guest40fc7cd/threading- successes-06-allegorithmic, Mar. 31, 2009, 38 Pages.
Ma, Y., et al., "Task-Tree Based Large-Scale Mosaicking for Massive Remote Sensed Imageries with Dynamic DAG Scheduling", IEEE Transactions on Parallel and Distributed Systems, vol. 25, No. 8, Aug. 2014, 12 Pages.
Saifullah, A., et al., "Parallel Real-Time Scheduling of DAGs", IEEE Transactions on Parallel and Distributed Systems, vol. 25, No. 23, Dec. 2014, 12 Pages.
Yue, S., et al., "Dynamic DAG scheduling for many-task computing of distributed eco-hydrological model", The Journal of Supercomputing, 75: 510-532, Apr. 19, 2017, 23 Pages.

* cited by examiner

HETEROGENEOUS SCHEDULING FOR SEQUENTIAL COMPUTE DAG

CROSS-REFERENCE TO RELATED APPLICATIONS

This application is a national phase filing under section 371 of PCT/CN2019/084742, filed Apr. 28, 2019, which claims the priority of U.S. Provisional Patent Application No. 62/729,646 filed Sep. 11, 2018 titled "HETEROGENEOUS SCHEDULING FOR SEQUENTIAL COMPUTE DAG," each of which is incorporated herein by reference in its entirety.

TECHNICAL FIELD

The present disclosure relates generally to inter-node processing, and, in particular embodiments, to a system and method for constructing directed acyclic graph (DAG) computation models for inter-node parallel processing between different processing unit types.

BACKGROUND

Generally, the processing of directed acyclic graph (DAG) modelled type computations, with sequential line topology, is implemented using intra-node parallelism. In intra-node parallelism, multiple cores of a central processing unit (CPU), a graphics processing unit (GPU), or any other application-specific processor type, process each node of the DAG in a sequential operation. Each computational task in a DAG modelled type computation is associated or mapped to an individual DAG node. In certain computations, the computational task may be subdivided into smaller subtasks. In intra-node parallelism processing, the scheduling granularity is constrained within a single node and no inter-node parallelism processing, using different processing units, is achieved between multiple DAG nodes or within each DAG node.

SUMMARY

Technical advantages are generally achieved by embodiments of this disclosure, which describe construction of directed acyclic graph (DAG) computation models for inter-node parallel processing between different processing unit types.

In accordance with an embodiment, a method for processing a directed acyclic graph (DAG) computation is provided. The method includes splitting, by a plurality of processors, the DAG computation into a plurality of non-interdependent sub-nodes within each respective node. The plurality of processors including a multi-core graphics processing unit (GPU) and a multi-core central processing unit (CPU). The method further includes constructing, by the plurality of processors, a plurality of sub-DAG computations. Each sub-DAG computation including at least a non-interdependent sub-node from different nodes of the DAG computation. The method further includes processing, by the plurality of processors, each of the plurality of sub-DAG computations in parallel. In one example, the method further includes allocating, by the plurality of processors, an intermediate shared memory for the plurality of sub-DAG computations. Optionally, in such an example, or in another example, the method further includes scheduling, by the CPU or the GPU, the processing each of the plurality of sub-DAG computations. Optionally, in any one of the above-mentioned examples, or in another example, the scheduling further includes scheduling a processing of each sub-node by cores of the GPU or by cores of the CPU in accordance with a task type of a respective sub-node of the DAG computation. Optionally, in any one of the above-mentioned examples, or in another example, the DAG computation includes an image processing, a video processing, or a deep neural network processing application. Optionally, in any one of the above-mentioned examples, or in another example, a completion of a processing of a sub-node in a respective sub-DAG computation is a dependency of a processing of a next sub-node in the respective sub-DAG computation. Optionally, in any one of the above-mentioned examples, or in another example, a processing of a non-interdependent sub-node within a respective node is independent of a processing of another non-interdependent sub-node within a same respective node. Optionally, in any one of the above-mentioned examples, or in another example, the constructing is done manually or automatically by a compiler executed by the plurality of processors. Optionally, in any one of the above-mentioned examples, or in another example, the method further includes receiving an input for the DAG computation. Optionally, in any one of the above-mentioned examples, or in another example, the method further includes outputting an output data buffer, an output image buffer, an output image file, or an output feature of the DAG computation. Optionally, in any one of the above-mentioned examples, or in another example, the splitting is in accordance with a task type associated with each node and a memory capability of the plurality of processors. Optionally, in any one of the above-mentioned examples, or in another example, the splitting includes uniform non-interdependent sub-nodes. Optionally, in any one of the above-mentioned examples, or in another example, the splitting includes non-uniform non-interdependent sub-nodes. Optionally, in any one of the above-mentioned examples, or in another example, the splitting includes boundary overlapping non-interdependent sub-nodes. Optionally, in any one of the above-mentioned examples, or in another example, each sub-node is a sub-task associated with a respective node of the DAG computation. Optionally, in any one of the above-mentioned examples, or in another example, one or more nodes of the DAG computation are split hierarchically. Optionally, in any one of the above-mentioned examples, or in another example, one or more sub-nodes of one or more sub-DAG computations depend on a plurality of sub-node outputs. Optionally, in any one of the above-mentioned examples, or in another example, one or more sub-nodes of one or more sub-DAG computations are an input to a plurality of sub-nodes.

In accordance with another embodiment, a computer-implemented method for processing a directed acyclic graph (DAG) computation is provided. The method includes splitting, by a plurality of processors, the DAG computation into a plurality of non-interdependent sub-nodes within each respective node. The plurality of processors including a multi-core graphics processing unit (GPU) and a multi-core central processing unit (CPU). The method further includes constructing, by the plurality of processors, a plurality of sub-DAG computations. Each sub-DAG computation including at least a non-interdependent sub-node from different nodes of the DAG computation. The method further includes processing, by the plurality of processors, each of the plurality of sub-DAG computations in parallel. In one example, the method further includes allocating, by the plurality of processors, an intermediate shared memory for the plurality of sub-DAG computations. Optionally, in such an example, or in another example, the method further includes scheduling, by the CPU or the GPU, the processing each of the plurality of sub-DAG computations. Optionally, in any one of the above-mentioned examples, or in another example, the scheduling further includes scheduling a processing of each sub-node by cores of the GPU or by cores of the CPU in accordance with a task type of a respective sub-node of the DAG computation. Optionally, in any one of the above-mentioned examples, or in another example, the DAG computation includes an image processing, a video processing, or a deep neural network processing application. Optionally, in any one of the above-mentioned examples, or in another example, a completion of a processing of a sub-node in a respective sub-DAG computation is a dependency of a processing of a next sub-node in the respective sub-DAG computation. Optionally, in any one of the above-mentioned examples, or in another example, a processing of a non-interdependent sub-node within a respective node is independent of a processing of another non-interdependent sub-node within a same respective node. Optionally, in any one of the above-mentioned examples, or in another example, the constructing is done manually or automatically by a compiler executed by the plurality of processors. Optionally, in any one of the above-mentioned examples, or in another example, the method further includes receiving an input for the DAG computation. Optionally, in any one of the above-mentioned examples, or in another example, the method further includes outputting an output data buffer, an output image buffer, an output image file, or an output feature of the DAG computation. Optionally, in any one of the above-mentioned examples, or in another example, the splitting is in accordance with a task type associated with each node and a memory capability of the plurality of processors. Optionally, in any one of the above-mentioned examples, or in another example, the splitting includes uniform non-interdependent sub-nodes. Optionally, in any one of the above-mentioned examples, or in another example, the splitting includes non-uniform non-interdependent sub-nodes. Optionally, in any one of the above-mentioned examples, or in another example, the splitting includes boundary overlapping non-interdependent sub-nodes. Optionally, in any one of the above-mentioned examples, or in another example, each sub-node is a sub-task associated with a respective node of the DAG computation. Optionally, in any one of the above-mentioned examples, or in another example, one or more nodes of the DAG computation are split hierarchically. Optionally, in any one of the above-mentioned examples, or in another example, one or more sub-nodes of one or more sub-DAG computations depend on a plurality of sub-node outputs. Optionally, in any one of the above-mentioned examples, or in another example, one or more sub-nodes of one or more sub-DAG computations are an input to a plurality of sub-nodes.

In accordance with yet another embodiment, a non-transitory computer-readable media storing computer instructions for processing a directed acyclic graph (DAG) computation is provided. The instructions when executed by a plurality of processors, including a first processing unit and a second processing unit, perform the steps of splitting, by a plurality of processors, the DAG computation into a plurality of non-interdependent sub-nodes within each respective node, the plurality of processors comprising a multi-core graphics processing unit (GPU) and a multi-core central processing unit (CPU). The instructions when executed perform the steps of constructing, by the plurality of processors, a plurality of sub-DAG computations. Each sub-DAG computation comprising at least a non-interdependent sub-node from different nodes of the DAG computation. The instructions when executed perform the steps of processing, by the plurality of processors, each of the plurality of sub-DAG computations in parallel. In one example, the instructions that when executed by a plurality of processors perform the steps of allocating, by the plurality of processors, an intermediate shared memory for the plurality of sub-DAG computations. Optionally, in such an example, or in another example, the instructions when executed perform the steps of scheduling, by the CPU or the GPU, the processing each of the plurality of sub-DAG computations. Optionally, in any one of the above-mentioned examples, or in another example, the scheduling further includes scheduling a processing of each sub-node by cores of the GPU or by cores of the CPU in accordance with a task type of a respective sub-node of the DAG computation. Optionally, in any one of the above-mentioned examples, or in another example, the instructions when executed perform the steps of the DAG computation includes an image processing, a video processing, or a deep neural network processing application. Optionally, in any one of the above-mentioned examples, or in another example, the completion of a processing of a sub-node in a respective sub-DAG computation is a dependency of a processing of a next sub-node in the respective sub-DAG computation. Optionally, in any one of the above-mentioned examples, or in another example, a processing of a non-interdependent sub-node within a respective node is independent of a processing of another non-interdependent sub-node within a same respective node. Optionally, in any one of the above-mentioned examples, or in another example, the constructing is done manually or automatically by a compiler executed by the plurality of processors. Optionally, in any one of the above-mentioned examples, or in another example, the instructions when executed perform the steps of receiving an input for the DAG computation. Optionally, in any one of the above-mentioned examples, or in another example, the instructions when executed perform the steps of outputting an output data buffer, an output image buffer, an output image file, or an output feature of the DAG computation. Optionally, in any one of the above-mentioned examples, or in another example, the splitting is in accordance with a task type associated with each node and a memory capability of the plurality of processors. Optionally, in any one of the above-mentioned examples, or in another example, the splitting includes uniform non-interdependent sub-nodes. Optionally, in any one of the above-mentioned examples, or in another example, the splitting includes non-uniform non-interdependent sub-nodes. Optionally, in any one of the above-mentioned examples, or in another example, the splitting includes boundary overlapping non-interdependent sub-nodes. Optionally, in any one of the above-mentioned examples, or in another example, each sub-node is a sub-task associated with a respective node of the DAG computation. Optionally, in any one of the above-mentioned examples, or in another example, one or more nodes of the DAG computation are split hierarchically. Optionally, in any one of the above-mentioned examples, or in another example, one or more sub-nodes of one or more sub-DAG computations depend on a plurality of sub-node outputs. Optionally, in any one of the above-mentioned examples, or in another example, one or more sub-nodes of one or more sub-DAG computations are an input to a plurality of sub-nodes.

In accordance with an embodiment, a device for processing a directed acyclic graph (DAG) computation is provided. The device includes a non-transitory memory storage comprising instructions and a plurality of processors comprising a central processing unit (CPU) and a graphics processing unit (GPU). The plurality of processors are in communication with the non-transitory memory storage and execute the instructions to split the DAG computation into a plurality of non-interdependent sub-nodes within each respective node. The plurality of processors execute the instructions to construct a plurality of sub-DAG computations. Each sub-DAG computation comprising at least a non-interdependent sub-node from different nodes of the DAG computation. The plurality of processors execute the instructions to process each of the plurality of sub-DAG computations in parallel. In one example, the plurality of processors execute the instructions to allocate an intermediate shared memory for the plurality of sub-DAG computations. Optionally, in such an example, or in another example, the plurality of processors execute the instructions to schedule, by the CPU or the GPU, the processing of each of the plurality of sub-DAG computations. Optionally, in any one of the above-mentioned examples, or in another example, the scheduling further includes scheduling a processing of each sub-node by cores of the GPU or by cores of the CPU in accordance with a task type of a respective sub-node of the DAG computation. Optionally, in any one of the above-mentioned examples, or in another example, the DAG computation includes an image processing, a video processing, or a deep neural network processing application. Optionally, in any one of the above-mentioned examples, or in another example, a completion of a processing of a sub-node in a respective sub-DAG computation is a dependency of a processing of a next sub-node in the respective sub-DAG computation. Optionally, in any one of the above-mentioned examples, or in another example, a processing of a non-interdependent sub-node within a respective node is independent of a processing of another non-interdependent sub-node within a same respective node. Optionally, in any one of the above-mentioned examples, or in another example, the constructing is done manually or automatically by a compiler executed by the plurality of processors. Optionally, in any one of the above-mentioned examples, or in another example, the plurality of processors execute the instructions to receive an input for the DAG computation. Optionally, in any one of the above-mentioned examples, or in another example, the plurality of processors execute the instructions to output an output data buffer, an output image buffer, an output image file, or an output feature of the DAG computation. Optionally, in any one of the above-mentioned examples, or in another example, the splitting is in accordance with a task type associated with each node and a memory capability of the plurality of processors. Optionally, in any one of the above-mentioned examples, or in another example, the splitting includes uniform non-interdependent sub-nodes. Optionally, in any one of the above-mentioned examples, or in another example, the splitting includes non-uniform non-interdependent sub-nodes. Optionally, in any one of the above-mentioned examples, or in another example, the splitting includes boundary overlapping non-interdependent sub-nodes. Optionally, in any one of the above-mentioned examples, or in another example, each sub-node is a sub-task associated with a respective node of the DAG computation. Optionally, in any one of the above-mentioned examples, or in another example, one or more nodes of the DAG computation are split hierarchically. Optionally, in any one of the above-mentioned examples, or in another example, one or more sub-nodes of one or more sub-DAG computations depend on a plurality of sub-node outputs. Optionally, in any one of the above-mentioned examples, or in another example, one or more sub-nodes of one or more sub-DAG computations are an input to a plurality of sub-nodes.

In accordance with another embodiment, a device for processing a directed acyclic graph (DAG) computation is provided. The device includes a non-transitory memory storage comprising instructions and a plurality of processors. The plurality of processors include a first processing unit and a second processing unit, the first processing unit and the second processing unit being a different processor type. The plurality of processors are in communication with the non-transitory memory storage and the plurality of processors execute the instructions to split the DAG computation into a plurality of non-interdependent sub-nodes within each respective node. The plurality of processors execute the instructions to construct a plurality of sub-DAG computations. Each sub-DAG computation comprising at least a non-interdependent sub-node from different nodes of the DAG computation and process each of the plurality of sub-DAG computations in parallel. In one example, the plurality of processors execute the instructions to allocate an intermediate shared memory for the plurality of sub-DAG computations. Optionally, in such an example, or in another example, the plurality of processors execute the instructions to schedule, by the CPU or the GPU, the processing each of the plurality of sub-DAG computations. Optionally, in any one of the above-mentioned examples, or in another example, the scheduling further includes scheduling a processing of each sub-node by cores of the GPU or by cores of the CPU in accordance with a task type of a respective sub-node of the DAG computation. Optionally, in any one of the above-mentioned examples, or in another example, the DAG computation includes an image processing, a video processing, or a deep neural network processing application. Optionally, in any one of the above-mentioned examples, or in another example, a completion of a processing of a sub-node in a respective sub-DAG computation is a dependency of a processing of a next sub-node in the respective sub-DAG computation. Optionally, in any one of the above-mentioned examples, or in another example, a processing of a non-interdependent sub-node within a respective node is independent of a processing of another non-interdependent sub-node within a same respective node. Optionally, in any one of the above-mentioned examples, or in another example, the constructing is done manually or automatically by a compiler executed by the plurality of processors. Optionally, in any one of the above-mentioned examples, or in another example, the plurality of processors execute the instructions to receive an input for the DAG computation. Optionally, in any one of the above-mentioned examples, or in another example, the plurality of processors execute the instructions to output an output data buffer, an output image buffer, an output image file, or an output feature of the DAG computation. Optionally, in any one of the above-mentioned examples, or in another example, the splitting is in accordance with a task type associated with each node and a memory capability of the plurality of processors. Optionally, in any one of the above-mentioned examples, or in another example, the splitting includes uniform non-interdependent sub-nodes. Optionally, in any one of the above-mentioned examples, or in another example, the splitting includes non-uniform non-interdependent sub-nodes. Optionally, in any one of the above-mentioned examples, or in another example, the splitting includes boundary overlapping non-interdependent sub-nodes. Optionally, in any one of the above-mentioned examples, or in another example, each sub-node is a sub-task associated with a respective node of the DAG computation. Optionally, in any one of the above-mentioned examples, or in another example, each of the first processing unit and the second processing unit are a different processor type selected from a group consisting of a central processing unit (CPU), a graphics processing unit (GPU), a digital signal processor (DSP), an image signal processor (ISP), a video processing unit (VPU), a neural network processing unit (NPU), and a display processing unit (DPU). Optionally, in any one of the above-mentioned examples, or in another example, the device further includes at least one of an interconnect bus link, a shared memory unit, a memory controller, one or more memory units, or a peripheral interconnect, or a combination thereof. Optionally, in any one of the above-mentioned examples, or in another example, one or more nodes of the DAG computation are split hierarchically. Optionally, in any one of the above-mentioned examples, or in another example, one or more sub-nodes of one or more sub-DAG computations depend on a plurality of sub-node outputs. Optionally, in any one of the above-mentioned examples, or in another example, one or more sub-nodes of one or more sub-DAG computations are an input to a plurality of sub-nodes.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
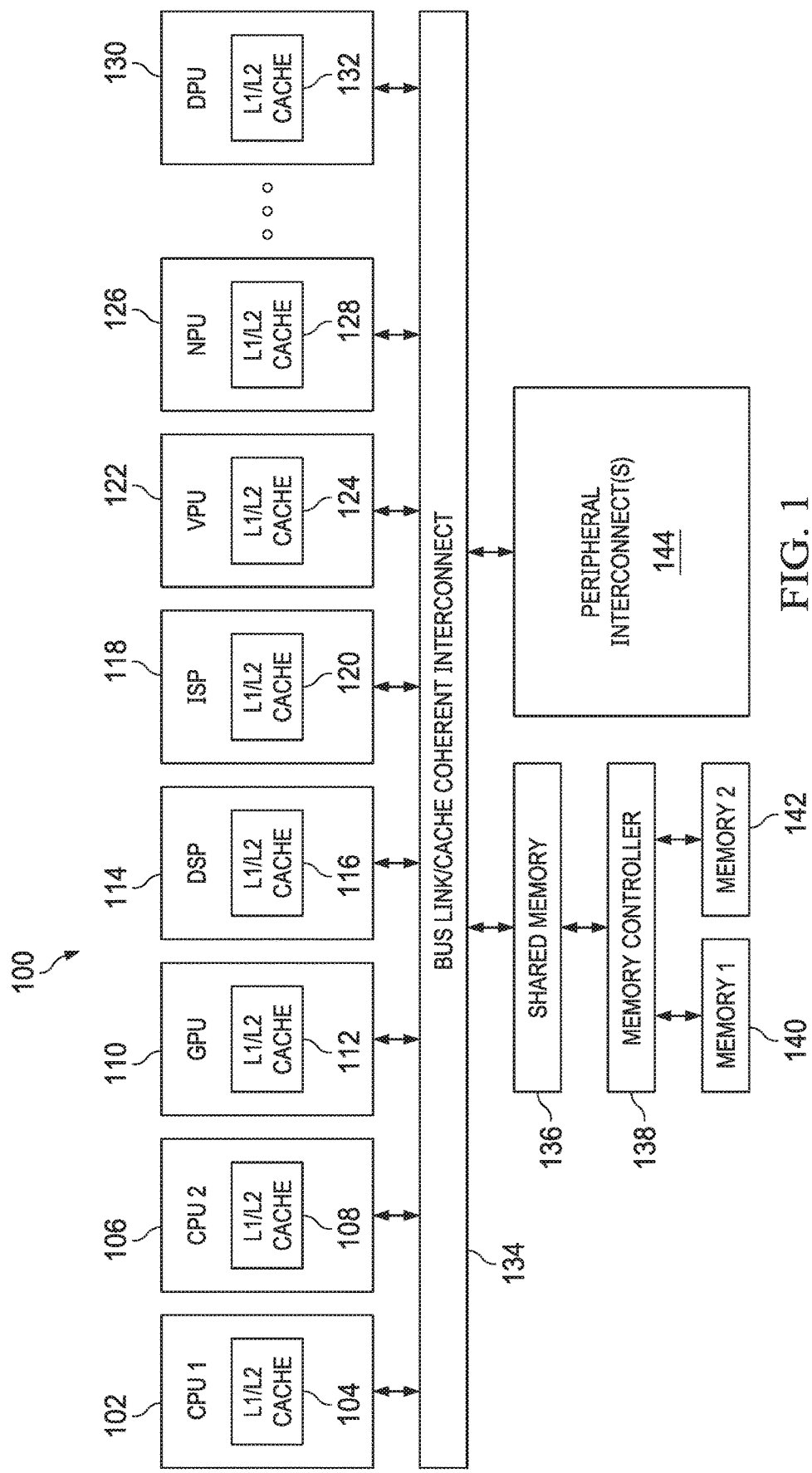
FIG. 1 is a diagram of an embodiment processing system.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of a graphics processing unit (GPU) and a central processing unit (CPU), it should also be appreciated that those inventive aspects may also be applicable to other processing units to provide for inter-node parallel processing in directed acyclic graph (DAG) model computations.

The processing of DAG computations is generally implemented using intra-node parallelism, in which multiple cores of a same processing unit process each node of the DAG in a sequential and dependent manner. In particular, each computational task in a DAG computation model is associated or mapped to an individual node, and in certain computations, the computational task may be subdivided into smaller subtasks. In intra-node parallelism processing, the scheduling granularity is constrained within a single node and no parallel processing using different processing units is achieved between multiple nodes or within each node. As an example, subtasks associated with a first node may be parallel processed by multiple cores of a CPU and subtasks associated with a second node may be parallel processed by multiple cores of a GPU. However, the scheduling of the processing by the GPU of the second node does not begin until scheduling of the processing by the CPU of the first node is complete. As such, each node in intra-node parallel processing is computed independently and sequentially by a specific processing unit. This results in wasted resource utilization in a processing system.

Embodiments of this disclosure provide for the construction and scheduling of an updated DAG computation model for inter-node parallel processing based on an original DAG computation model originally used for intra-node parallel processing. Certain embodiments of the disclosure may advantageously enable parallelism, using different processing units, to be achieved between multiple DAG nodes. In other embodiments, parallelism, using different processing units, may advantageously be achieved within subtasks of different nodes of the original DAG computation model. In particular, each subtask, previously associated with a single node, may be represented as a new node in a modified DAG computation model. The transformation of the original node into multiple new sub-nodes and the arrangement of a new DAG computation model based on the multiple new sub-nodes may then allow multiple hardware resources (i.e., CPU, GPU, etc.) to be simultaneously utilized in the computation of the new DAG computation model. As a result, the processing system is able to process a DAG computation model at a rate that is significantly faster and more efficient than previously performed using, for example, intra-node parallel processing. These and other details are discussed in greater detail below.

FIG. 1 illustrates a block diagram of an embodiment processing system 100 for performing methods described herein, which may be installed in a host device. As shown, the processing system 100 includes central processing units (CPUs) 102 and 106, a graphics processing unit (GPU) 110, a digital signal processor (DSP) 114, an image signal processor (ISP) 118, a video processing unit (VPU) 122, a neural network processing unit (NPU) 126, a display processing unit (DPU) 130, an interconnect bus link 134, a shared memory unit 136, a memory controller 138, memory units 140 and 142, and peripheral interconnect 144, which may (or may not) be arranged as shown in FIG. 1. The processing system 100 may include additional components not depicted in FIG. 1, such as long-term storage (e.g., non-volatile memory, etc.). In some embodiments, the processing system 100 may include a subset of the various processing units. The illustrated quantity of each component in FIG. 1 is illustrated for simplicity of the discussion. Additional number of same component types may be contemplated in various embodiments.

In some embodiments, each component of the processing system 100 may be located on a single chip or circuit, for example, in a system on a chip (SoC) type of integrated circuit (IC). In other embodiments, each component of the processing system 100 may be located on a different chip or circuit. In an embodiment, some components of the processing system 100 may be located on the same chip or circuit while some components may be located on a different chip or circuit.

The CPUs 102 and 106 may be used to carry out basic arithmetic, logic, input/output (I/O), and control operations of sets of instructions in the processing system 100. The GPU 110 may be used to carry out efficient computer graphics calculations and image processing operations of sets of instructions in the processing system 100. The DSP 114 may be used to efficiently measure, filter, or compress analog signals or process digital signal processing algorithms in the processing system 100. The ISP 118 is a specialized type of DSP 114 that may be used to efficiently process images in the processing system 100. The VPU 122 is also a specialized type of DSP 114 that may be used to efficiently process video in the processing system 100. The NPU 126 may be used to process data and solve problems using neural networking in the processing system 100. The DPU 130 may be used to process data related to the display of the processing system 100. Examples of other types of processing units not shown in FIG. 1 that may be implemented using embodiments of this disclosure are an application processing unit (APU), a field programmable gate array (FPGA), a microcontroller, etc. Each processing unit of the processing system 100 may be architecturally optimized and designed to perform a non-limiting set of specific tasks in an efficient or accelerated manner. The list of processing units as illustrated in FIG. 1 is non-limiting example of task specific processors, each having multiple cores. As an example, the GPU 110 can be architecturally optimized to repeatedly operate a same operation on large batches of data more quickly and efficiently than the CPUs 102 and 106. Each of the various processing units may independently include hardware caches 104, 108, 112, 116, 120, 124, 128, and 132 organized as a hierarchy of more cache levels (L1, L2, etc.). Each processing unit may also include several or hundreds of cores that can handle many thousands of threads simultaneously.

The interconnect bus link 134 is a communication link or cache coherent interconnect used to transfer data between the various processing units, the shared memory 136, and the peripheral interconnect 144. The interconnect bus link 134 may be a software or hardware type control bus, an address bus, or a data bus that operates across multiple communication protocols. The interconnect bus link 134 may have a variety of topologies such as multi-drop, daisy chain, switch, etc.

The shared memory 136 may be any component or collection of components adapted to store programming and/or instructions, and associated input/output data and/or intermediate data for execution by any of the processing units. Each processing unit may have access to the shared memory 136 through the interconnect bus link 134. The shared memory 136 may be a non-transitory computer-readable media. The non-transitory computer-readable media includes all types of computer readable media, including magnetic storage media, optical storage media, flash media, and solid state storage media. It should be understood that software can be installed in and sold with the processing system 100. Alternatively, the software can be obtained and loaded into the processing system 100, including obtaining the software through physical medium or distribution system, including, for example, from a server owned by the software creator or from a server not owned but used by the software creator. The software can be stored on a server for distribution over the internet, for example.

The memory controller 138 is used to manage flow of data going to and from the shared memory 136. In some embodiments, the memory controller 138 may be an integrated memory controller (IMC). In some embodiments, the memory controller 138 may be an external component to the processing system 100. The memory units 140 and 142 may be a double data rate (DDR) type of memory or a low-power DDR (LPDDR) type of memory. The peripheral interconnect 144 may be any component or collection of components that allow the processing system 100 to communicate with other devices/components and/or a user. In an embodiment, the peripheral interconnect 144 may be adapted to communicate data, control, or be used to manage messages from the processor 100 to applications installed on the host device and/or a remote device. In another embodiment, the peripheral interconnect 144 may be adapted to allow a user or user device (e.g., personal computer (PC), etc.) to interact/communicate with the various processing units of the processing system 100.

Figure 2A:
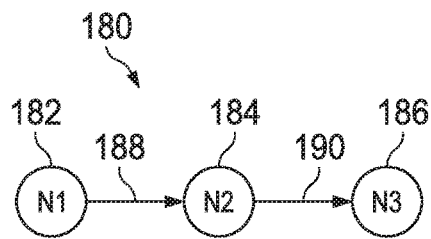
FIG. 2A is an example directed acyclic graph (DAG) computation model with three nodes.

FIG. 2A is an example DAG computation model 180 including three nodes N1 182, N2 184, and N3 186. The DAG computation model 180 may be a graph used, for example, in image processing, video processing, or in a deep neural network processing application. In particular, the DAG computation model 180 may be a graph model of any type of application processing that can be split into multiple layers or separate synchronized computational tasks. FIG. 2A illustrates a DAG computation model 180 that includes 3 nodes; however, it should be appreciated that a DAG computation may have any number of nodes greater than 2. In this example, each node N1, 182, N2 184, and N3 186 is associated with a separate task or computational block within the DAG computation model 180.

In a processing system with multiple processor types, a processing unit may be used to schedule or assign each node to a particular processing unit based on the specific task needed to be completed at the node. This type of scheduling is typically done to take advantage of the optimized processing inherent in the different processing types. As an example, in the processing system 100 of FIG. 1, the GPU 110 may be tasked to process node N1 182, the DSP 114 may be tasked to process node N2 184, and the CPU 102 may be tasked to process node N3 186. Each node, in turn, can be divided into multiple sub-tasks or multiple computational blocks, as further detailed below.

In a processing system where different processing types include multiple cores, each sub-task or computational block within a node may be intra-node processed, using a scheduling of the processing units, by a separate core of the specific processing type. In intra-node parallel processing of the DAG computation model 180, the task associated with node N2 184 does not begin until the task associated with node N1 182 is complete. In other words, the output 188 of node N1 182 is the input to node N2 184; the output 190 of node N2 182 is the input to node N3 186; and so forth for the other nodes.

In general, as each node of the DAG computation model 180 is arranged in a sequential and interdependent configuration, the total time for processing the DAG computation is the accumulation of the time to process each node. As an example, if processing all sub-nodes of node N1 182 takes T1 time, processing all sub-nodes of node N2 184 takes T2 time, and processing all sub-nodes of node N3 186 takes T3 time, the total time to process the computation model is Ttotal=T1+T2+T3. During time T1, the processing unit assigned to node N1 182 is active while the processing units assigned to node N2 184 and node N3 186 are idle. During time T2, the processing unit assigned to node N2 184 is active while the processing units assigned to node N1 182 and node N3 186 are idle. During time T3, the processing unit assigned to node N3 186 is active while the processing units assigned to node N1 182 and node N2 184 are idle. The embodiments of this disclosure provide methods to reconstruct the DAG computation model 180 to minimize the idle time of the different processing units.

Figure 2B:
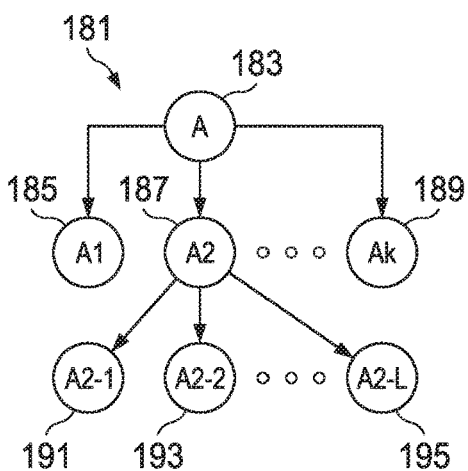
FIG. 2B is an example hierarchically splitting of a DAG node.

FIG. 2B illustrates an example hierarchically splitting 181 of a DAG node 183. In a first level of the hierarchy, node A 183 is split into sub-nodes A1 185, A2 187, . . . , Ak 189. In a second level of the hierarchy, sub-node A2 187 is illustrated to be split into sub-nodes A2-1 191, A2-2 193, . . . , A2-L 195. The splitting of a node can continue in further hierarchical layers, such as the third layer, fourth layer, fifth layer, and so on. Although, sub-node A2 187 is shown to be split into further sub-nodes, it should be appreciated that any number of sub-nodes of A, such as A1-Ak 185-189, may be split into further hierarchical sub-nodes. The number of sub-nodes at each hierarchical split is non-limiting and can be any number appropriate associated with a corresponding sub-task within a DAG computation model in which the DAG node 183 is represented.

Figure 3:
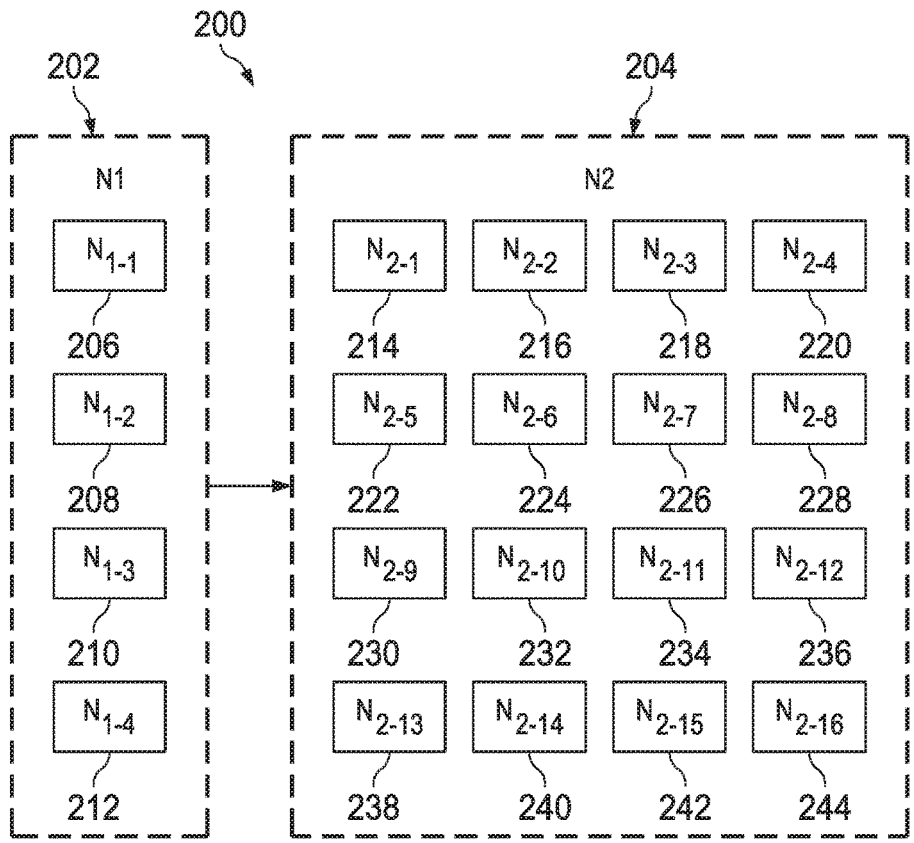
FIG. 3 is an example of a DAG computation model with two nodes and each node having multiple sub-nodes.

FIG. 3 is an example DAG computation model 200 including two nodes N1 202 and N2 204, each having multiple sub-nodes. In the context of the DAG computation model 200, Node 2 204 is dependent on Node 1 202. As shown, Node N1 202 includes four (4) sub-nodes N1-1 206, N1-2 208, N1-3 210, and N1-4 212. Node N2 204 includes sixteen (16) sub-nodes N2-1 214, N2-2 216, . . . , N2-15 242, and N2-16 244. Although four (4) sub-nodes for node N1 202 and sixteen (16) sub-nodes for node 204 are illustrated, the number of sub-nodes may be application dependent and the quantity of sub-nodes in each node, as illustrated, are for simplicity of the discussion.

In one example, with respect to intra-node parallel processing, each sub-task of node N1 202 may be processed by a core of a CPU 102 and each sub-task of node N2 204 may be processed by a core of a GPU 110. In another example, again with respect to intra-node parallel processing, each sub-task of node N1 202 may be processed by a core of a GPU 110 and each sub-task of node N2 204 may be processed by a core of a DSP 114. In yet another example, with respect to intra-node parallel processing, each sub-task of node N1 202 may be processed by a core of an ISP 118 and each sub-task of node N2 204 may be processed by a core of a DPU 130. In another example, with respect to intra-node parallel processing, some sub-tasks of node N1 202 may be processed by cores of a CPU 102 and some sub-tasks of node N1 202 may be processed by cores of a GPU 110. In this example, some sub-tasks of node N2 204 may be processed by cores of a DSP 114 and other sub-tasks of node N2 204 may be processed by cores of an ISP 118. It is noted that each sub-task may be operated by a different core of a particular type of processing unit and the particular processing unit may be selected to improve efficiency of the computation based on the available processing implemented in the dedicated hardware unit.

In an implementation of intra-node parallel processing, used to compute the DAG computation model 200, at the completion of each sub-task within a node, the subsequent node of the DAG computation model 200 does not begin processing any sub-task within that subsequent node until all sub-tasks of the previous node have been completed. This is presented in the form of a dependency within each node on receiving a complete set of outputs from the previous node. As such, in an example where two different processing units are used to process the DAG computation model 200, the first processing unit is actively processing node N1 202 while the second processing unit may be idle and waiting for the first processing unit to complete the computation. Similarly, the second processing unit is actively processing node N2 204 while the first processing unit remains idle.

Figure 4:
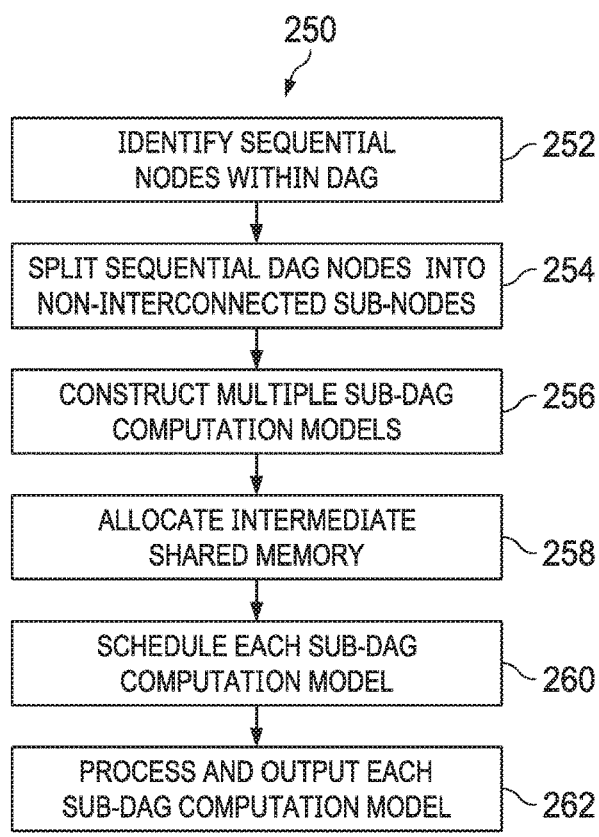
FIG. 4 is a flowchart of an embodiment method for splitting a DAG computation model and constructing multiple sub-DAG computation models for inter-node parallelism.

FIG. 4 is a flowchart of an embodiment method 250 for splitting a DAG computation model and constructing multiple sub-DAG computation models for inter-node parallelism, as may be performed by a processing system 100. A DAG computation model has a topological ordering in which each node is directed from an earlier node in a sequence of nodes. At step 252, the processing system 100, identifies the set of sequential and non-cyclical nodes within the DAG computation model.

At step 254, the processing system 100 splits each identified node into non-interdependent sub-nodes based on a task type and a computational memory requirement corresponding to each sub-node and each node. The splitting of a node into sub-nodes may be uniform, non-uniform, or overlapping. In a uniform splitting of a node, each sub-node or sub-task may have an equal size, while in a non-uniform splitting of a node, each sub-node or sub-task may have a different or non-equal size. In an overlapping splitting of a node, some sub-tasks may overlap with one or more other sub-tasks or a sub-task may have intersections in the sub-task boundary with another sub-task.

As an example, with respect to image processing and uniform splitting of the node, an image may be sub-divided into equal and smaller N by M (N×M) segments. As an example, with respect to image processing and non-uniform splitting of the node, an image may be sub-divided into non-equal and smaller N by M (N×M) segments. As an example, with respect to image processing and overlapping splitting of the node, an image may be sub-divided into non-equal or equal but overlapping smaller N by M (N×M) segments.

At step 256, the processing system 100 constructs multiple sub-DAG computation models using multiple non-interdependent sub-nodes from different nodes of the original DAG computation model. It should be understood that a sub-DAG computation model at a minimum has a non-interdependent sub-node from two different nodes but the variations of the construction of the multiple sub-DAG computation models may vary based on the computational task associated with the sub-nodes.

In some embodiments, each sub-DAG computation model can have a single non-interdependent sub-node from each node of the original DAG computation model. In some embodiments, each sub-DAG computation model can have a non-interdependent sub-node from some nodes of the original DAG computation model. In other embodiments, some sub-DAG computation models can have a non-interdependent sub-node from each node of the original DAG computation model while some sub-DAG computation models can have a non-interdependent sub-node from some nodes of the original DAG computation model.

The construction of the multiple sub-DAG computation models may be performed manually or performed automatically by a compiler. As an example of a manual construction, in a DAG computation model with less than 5 nodes, the construction of the multiple sub-DAG computation models can be performed by a pre-configured and static mapping table. The pre-configured and static mapping table may be used to map the original DAG computation model into multiple sub-DAG computation models.

As an example of an automated construction or compiler-aided construction, generally applicable to more complicated models with multiple DAG nodes, a compiler can be used to translate the original DAG computation model into multiple sub-DAG computation models dynamically and in run-time. In some embodiments, the translation from the original DAG computation model into multiple sub-DAG computation models may be pre-compiled using an OFFLINE compiler.

At step 258, the processing system 100 allocates, using an intermediate shared memory (cache) 136, memory for the multiple sub-DAG computations. The intermediate shared memory 136 may be used as a temporary storage location of an output of a sub-node computation to be used as an input of a subsequent sub-node of the same sub-DAG computation model. The intermediate shared memory acts as a buffer memory and reduces read and write times associated with an off-chip memory, such as an external double data rate (DDR) type memory or the L1, L2, etc. cache memory within a processing unit. In some embodiments, if there are no resource dependencies between the steps of splitting the DAG computation, step 254, and allocating memory, step 258, the steps may be performed at a same time. In some embodiments, if there are no resource dependencies between the steps of constructing the sub-DAG computation model, step 256, and allocating memory, step 258, the steps may be performed at a same time. In some embodiments, these steps may be done at different times.

At step 260, the processing system 100 schedules, using for example a CPU 102 or 104, the synchronization and dynamic tasks associated with each sub-DAG computation of the multiple sub-DAG computations. In some embodiments, a generated sub-DAG computation model may be different from another non-interdependent sub-DAG computation model. Initially resources are assigned for the multiple sub-DAG computation models at a high level, and subsequently, the processing system 100 schedules each sub-node within each sub-DAG computation at a lower level of processing associated with each sub-task.

In a DAG computation model, each node is constrained on the completion of the prior node. Similarly, each sub-node corresponding to a sub-DAG computation model is constrained on the completion of the prior sub-node. The scheduling provides an order in which each sub-task is to be performed within a sub-DAG computation model. In other words, the scheduling provides a topological sorting of the sub-tasks within a sub-DAG computation model.

The scheduling at step 260 may be an inter-node and/or an intra-node scheduling over one of the processing unit types. The topological sorting provides an efficient means for executing a set of tasks between and within each sub-DAG computation model based on the interdependencies of these tasks and shared resources. The result of the scheduling is that the total time period for processing the original DAG computation model is reduced, as less idle time is associated with different processing units in the processing system 100.

At step 262, the processing system 100 processes each of the multiple sub-DAG computations and compiles an associated output file. At the completion of the inter-node parallel processing of each multiple sub-DAG computation model, a final output is generated that is equal to the final output generated by the intra-node parallel processing of the original DAG computation model.

FIGS. 5A-D illustrate the construction of multiple sub-DAG computation models from a DAG computation model 300 using the embodiments of this disclosure, as may be performed by a processing system 100, for example, in an image processing application. An example of an image processing application that can be modeled using a DAG computation model is image blurring, which has applications in video games, demos, or high dynamic range (HDR) rendering. In these applications, image blurring or bloom shading can be used to reproduce, for example, an image effect of real-world cameras.

Figure 5A:
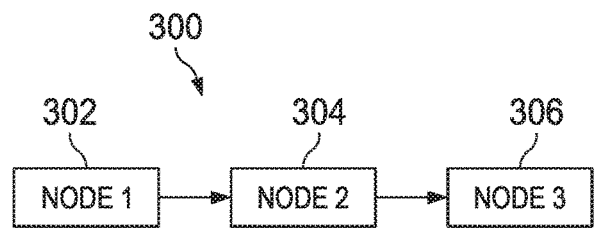
FIG. 5A is an example of a DAG computation model with three nodes used in an image processing application.

The DAG computation model 300 of FIG. 5A includes three nodes: a first node (Node 1) 302, a second node (Node 2) 304, and a third node (Node 3) 306. It is noted that additional nodes may also be contemplated. Each node is mapped to a particular computational task, for example, in an image processing application.

As an example, the first node 302 may correspond to acquiring an input image, the second node 304 may correspond to a transformation of the input image to an integral image, and the third node 306 may correspond to generating an output image from the integral image using, for example, Gaussian filtering.

In an embodiment, the output file may be an output data buffer. In another embodiment, the output file may be an output image buffer. In another embodiment, the output may be an output image file. And in some embodiments, the output file may be a set of output features of the DAG computation model. It should be appreciated that the specific arrangement of the particular nodes in the DAG computation model 300 is not the main topic of this disclosure and the DAG computation model 300 may be used as a generic DAG computation model for discussing the construction of a new DAG computation model in other applications.

Figure 5B:
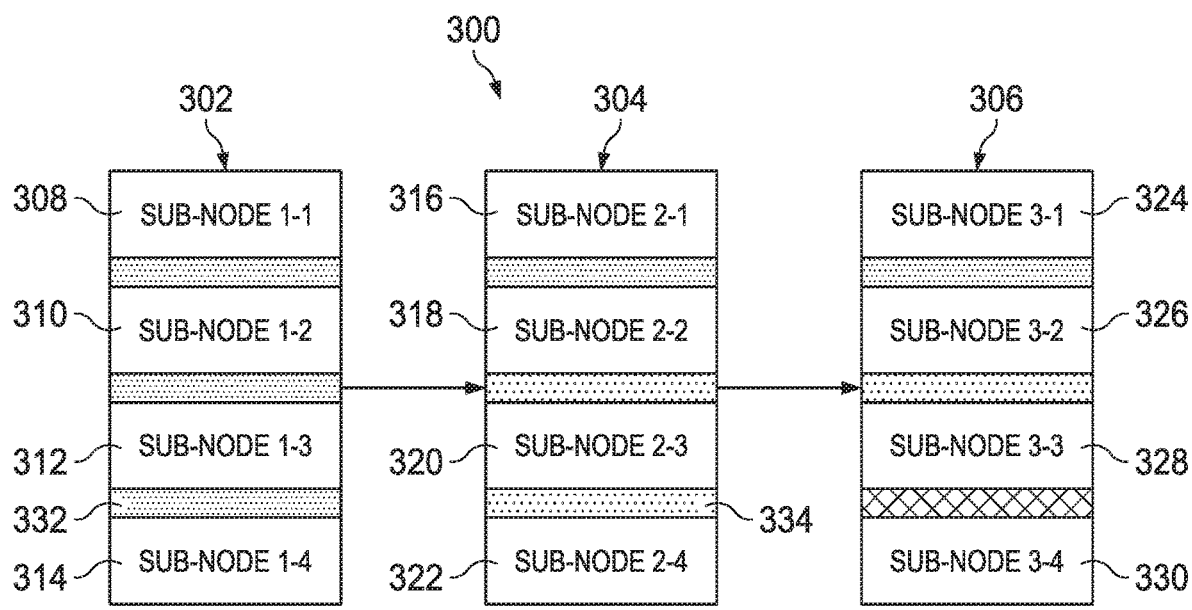
FIG. 5B is an example of a DAG computation model with three nodes used in an image processing example having multiple sub-nodes.

In FIG. 5B, each node of the DAG computation model 300, can be sub-divided into multiple sub-tasks or sub-nodes. The first node 302 is sub-divided into sub-node 1-1 308, sub-node 1-2 310, sub-node 1-3 312, and sub-node 1-4 314. The second node 304 is sub-divided into sub-node 2-1

316, sub-node 2-2 318, sub-node 2-3 320, and sub-node 2-4 322. The third node 306 is sub-divided into sub-node 3-1 324, sub-node 3-2 326, sub-node 3-3 328, and sub-node 3-4 330.

The division of the sub-tasks within each task may be uniform, non-uniform, or overlapping. As an example, the division 332 of the sub-tasks associated with sub-node 1-3 312 and sub-node 1-4 314 can be a carry_on line type, the division 334 of the sub-tasks associated with the sub-node 2-3 320, and sub-node 2-4 322 can have an overlapping area at the boundary. In some embodiments, a DAG computation model having two adjacent sub-blocks may have inter-dependencies within each other. As an example, the input to sub-node 2-4 322 may be the output of sub-node 2-3 320. In these embodiments, each line in the intersection area can be a carry-on line, which is an indication of the location for a carry-on result for the computation of a neighboring sub-node. The overlap area may be an intersection area between two adjacent sub-blocks, and may be one-line or multiple-lines.

Each sub-task may map to a same or different computational sub-task associated with the particular computational task of the respective node. In an intra-parallel processing of the DAG computation model 300, each sub-task can be scheduled for a different core of a same processing unit. In this type of processing, scheduling granularity is constrained within a single DAG node. As such, no parallelism is achieved between the DAG nodes or within inter-DAG nodes. This results in low hardware resource utilization, as a scheduling of a subsequent node cannot begin until the scheduling of a current is completed.

Figure 5C:
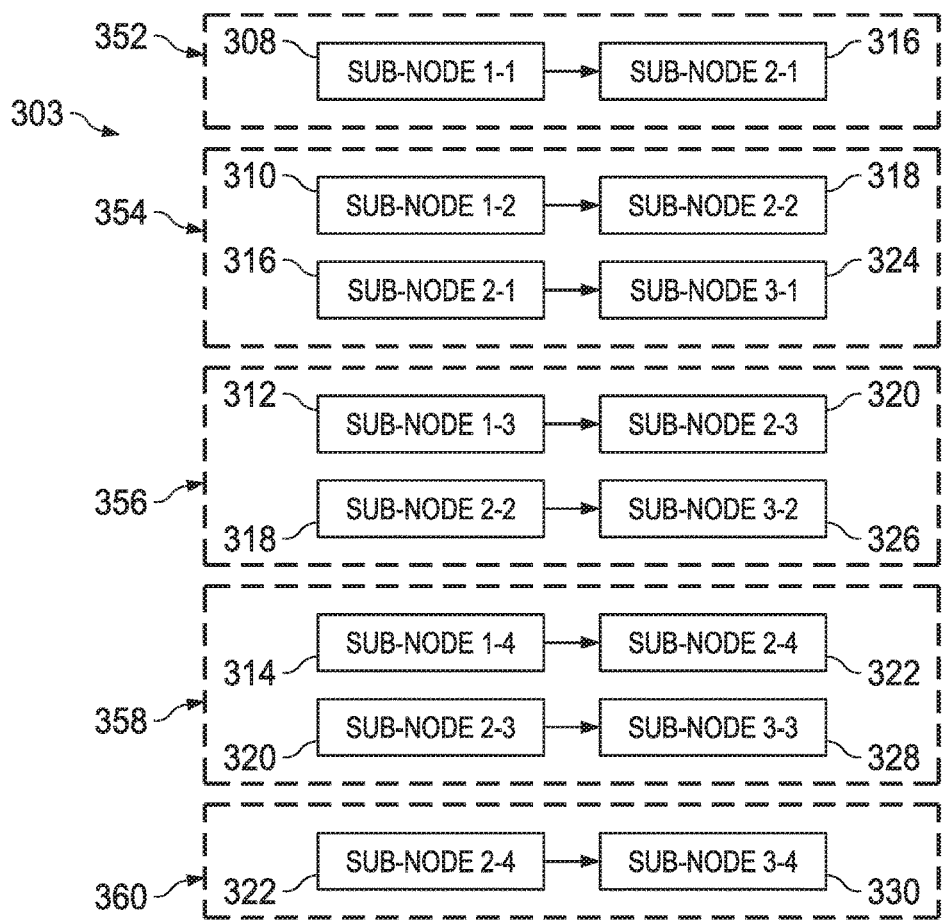
FIG. 5C is an example of constructing multiple new sub-DAG computation models based on the original DAG computation model optimized for internode parallel processing.

FIG. 5C illustrates an embodiment DAG computation model 303 including multiple sub-DAG computation models, as may be computed by the processing system 100. The DAG computation model 303 is a modified version of the DAG computation model 300. The DAG computation model 303 includes five (5) sub-DAG computation models 352, 354, 356, 358, and 360. Although five (5) sub-DAG computation models are shown in FIG. 5C for purposes of this discussion, the total number of sub-DAG computation models can be any number greater than one (1).

In the new arrangement, computation parallelism can be achieved using inter-node parallelism as well as inter-node and intra-node parallelism. In the new DAG computation model 303 arrangement of sub-nodes, multiple hardware resources (e.g., processing units) may be utilized to compute the new sub-DAG computation models in parallel. In an embodiment where each sub-DAG computation model is independent of the other sub-DAG computation model, the total processing time is reduced from T1+T2+T3 to the greater total time of (T1+T2) or (T2+T3).

Each sub-node within each sub-DAG computation model is arranged and constructed to have a more optimized dependency model within the sub-nodes of all the nodes. This is done to improve efficiency and decrease processing time of the DAG computation model 300. Each sub-node is processed by a different core of a processing unit. However, the arrangement of the sub-nodes within the sub-DAG computation models allow for less idle time between processing of the sub-nodes in the newly constructed model. As before, each processing unit is assigned to a sub-node in accordance with the particular capabilities of the processing unit and the sub-task associated with the sub-node.

As shown, the first sub-DAG computation model 352 includes sub-node 2-1 316 depending on sub-node 1-1 308. The second sub-DAG computation model 354 includes sub-node 2-2 318 depending on sub-node 1-2 310 in addition to sub-node 3-1 324 depending on sub-node 2-1 316. The third sub-DAG computation model 356 includes sub-node 2-3 320 depending on sub-node 1-3 312 in addition to sub-node 3-2 326 depending on sub-node 2-2 318. The fourth sub-DAG computation model 358 includes sub-node 2-4 322 depending on sub-node 1-4 314 in addition to sub-node 3-3 328 depending on sub-node 2-3 320. Finally, the fifth sub-DAG computation model 360 includes sub-node 3-4 330 depending on sub-node 2-4 330.

The output of the first sub-node of sub-DAG computation model 352 is an input for the second sub-node of sub-DAG computation model 352. Similarly, dependencies may still exist from one sub-DAG computation model to another. However, the completion time of the sub-task associated with the first sub-DAG computation model 352 is less than the completion time of the whole task associated with the DAG computation model 300. Other cores of a processing unit may be scheduled for execution of other sub-nodes in the same or in other sub-DAG computation models. Thus, the period of time where a processing unit remains idle and waiting for a completion of a task by another processing unit is decreased significantly.

Figure 5D:
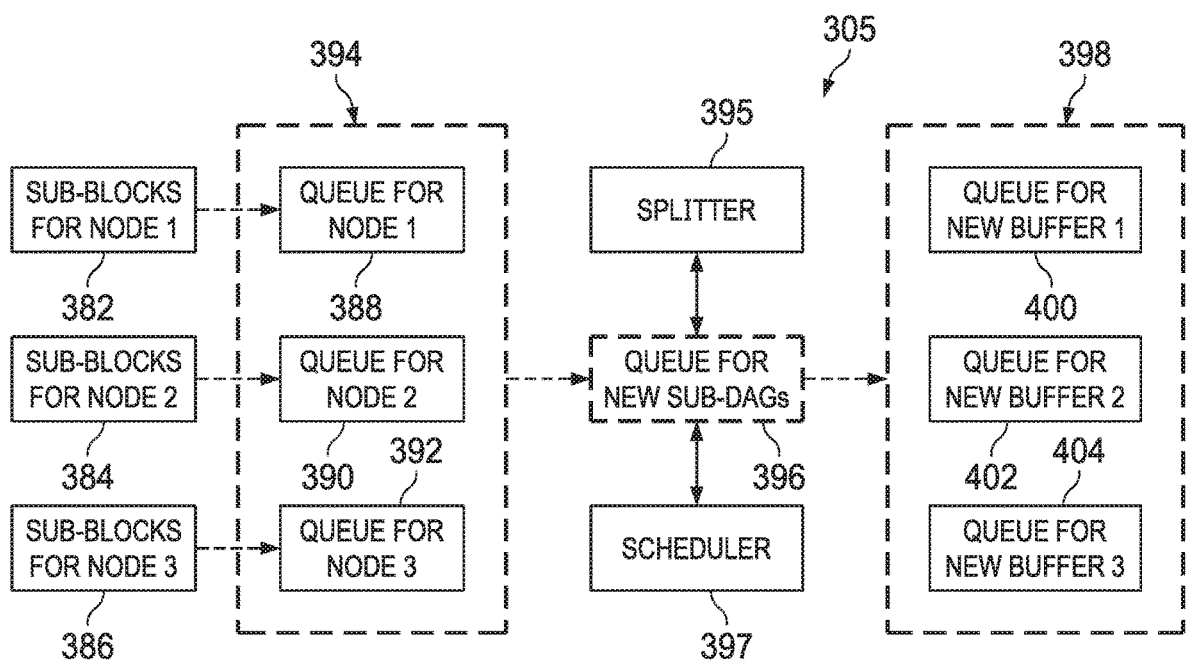
FIG. 5D is an example data flow of a memory allocation for constructing new sub-DAG computation models.

FIG. 5D illustrates an example data flow in memory blocks of the processing system 100 corresponding to the transformation of the DAG computation model 300 in FIG. 5B to the DAG computation model 303 in FIG. 5C. Each node of the DAG computation model 300 is divided into smaller sub-nodes or sub-tasks, which can be uniformly divided or non-uniformly divided. Each sub-block of the first node 382, each sub-block of the second node 384, and each sub-block of the third node 386 is then allocated a location in memory. In block 394, each sub-block of each node is then queued in memory and the information related to queueing address, size, shape, order information, etc. are recorded. The splitter 395 and the scheduler 397 using the information stored in block 394, generate a new queue for the new sub-DAG computation models. Block 398 illustrates an optional intermediate memory bank accessible from each of the processing units of the processing system 100. The intermediate memory may be used to store output results within and between the sub-DAG computation models for use by other processing units.

Figure 6A:
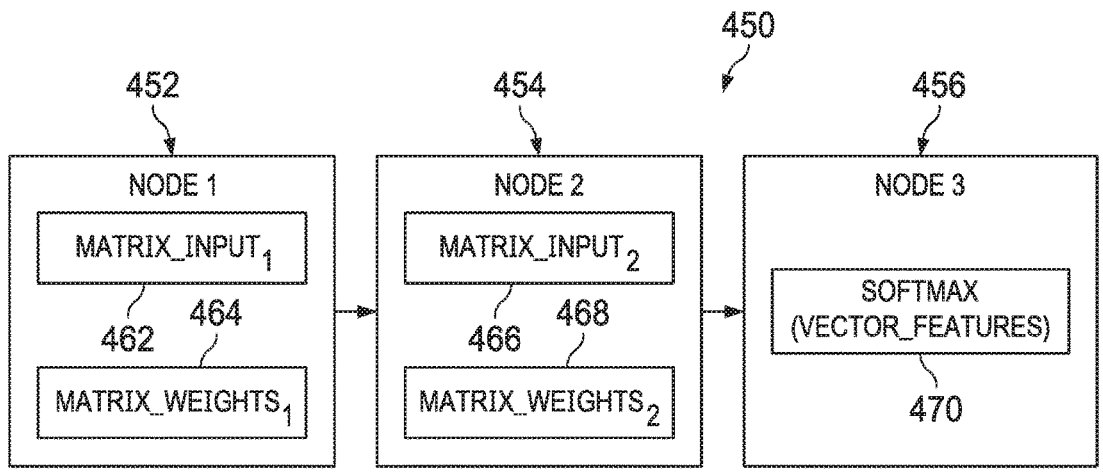
FIG. 6A is an example of a DAG computation model with three nodes used in a deep neural network processing application.
Figure 6B:
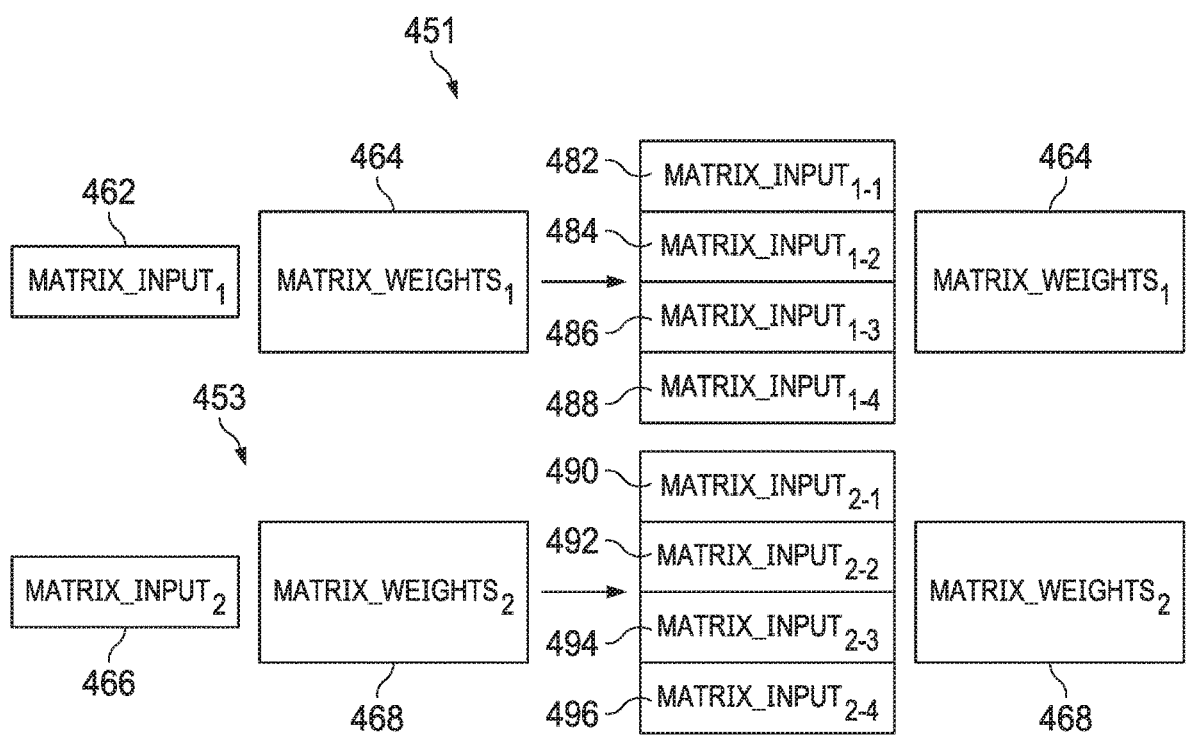
FIG. 6B is an example of splitting the input matrix of each node into multiple input-matrices.
Figure 6C:
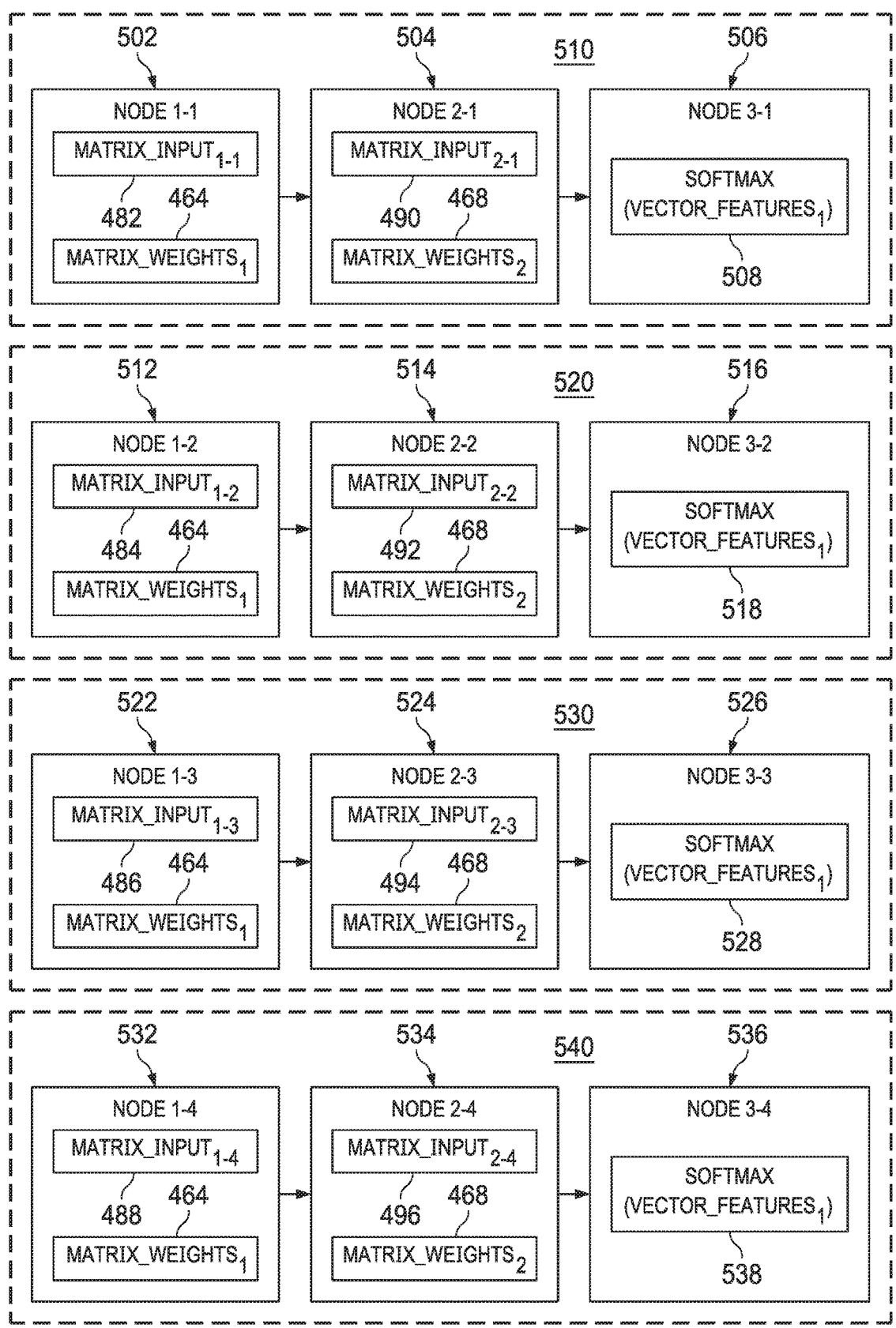
FIG. 6C is an example of constructing multiple new sub-DAG computation models based on the original deep neural network DAG computation model optimized for internode parallel processing.

FIGS. 6A-C illustrate the construction of multiple sub-DAG computation models from a DAG computation model 450 using the embodiments of this disclosure, as may be performed by a processing system 100 in, for example, a deep neural network (DNN) type of an application. Deep neural network is a type of machine learning that uses data representatives and typically includes multiple layers: an input layer, intermediate layers (i.e., hidden layers), and an output layer. Each layer or node has an associated function that may be different from any of the other layers, such as image convolution, pooling, normalization, feature map generation, etc.

In the deep neural network DAG computation model 450, data flows from the input layer or the first node (Node 1) 452 to the output layer or third node (Node 3) 456 without looping back. The first node 452 and the second node 454 of the deep neural network DAG computation model 450 include a matrix input and a corresponding matrix weight. The output node 456 of the deep neural network DAG computation model 450 is a normalized exponential representation using, for example, a softmax function 470. The deep neural network model has a first layer and a second layer, however additional nodes may also be contemplated.

The first node 452 includes a first matrix input 462 and a first matrix weight 464. The second node 454 includes a second matrix input 466 and a second matrix weight 468. In a typical deep neural network application, the input matrix and the weight matrix in each node is multiplied and a functional output representation between 0 and 1 is resulted. The deep neural network adjusts the weights and a respective output is evaluated until a particular pattern is recognized.

In FIG. 6B, each input matrix 462 and 466 of each node 452 and 454 is sub-divided into four (4) sub-matrices. Although the input matrix in this example is sub-divided into four sub-matrices, in other examples the sub-divisions can be any number greater than one (1).

In a typical solution for solving a deep neural network in a DAG computation using intra-node parallelism, such as those found in CAFFE or TensorFlow, each computation task associated with a node is scheduled layer-by-layer. Within each layer, intra-node parallelism may be achieved by multiple cores of a particular processing unit of the processing system 100. In intra-node parallel processing, the scheduling of the second node (input$_2$×weight$_2$) does not begin until the scheduling of the first node (input$_1$×weight$_1$) is complete. The completion of the first node corresponds to solving the first node (i.e., multiplying each input node with the weight in that node and completing a pattern recognition process).

FIG. 6C illustrates the modified DAG computation model 455 based on the sub-divided input matrices and corresponding weights. The DAG computation model 455 includes four (4) sub-DAG computation models 510, 520, 530, and 540. Although four (4) sub-DAG computation models are shown in FIG. 6C for purposes of this discussion, the total number of sub-DAG computation models can be any number greater than one (1). In the new arrangement, computation parallelism can be achieved using inter-node parallelism as well as inter-node and intra-node parallelism. In the new DAG computation model 455 arrangement of sub-nodes, multiple hardware resources (e.g., processing units) may be utilized to compute the new sub-DAG computation models. Each sub-divided matrix corresponds to a sub-task within a node of the DAG computation model 450. In this modified model, by splitting the original model into smaller sub-tasks and re-arranging the dependencies from within a task in the DAG computation model 450 to within the sub-tasks in each of the sub-DAG computation models, inter-node parallel processing can be achieved.

Each sub-node within each sub-DAG computation model is arranged and constructed to have a more optimized dependency model within the sub-nodes of all the nodes. This is done to improve efficiency and decrease processing time of the DAG computation model 450. Each sub-node is processed by a different core of a processing unit. However, the arrangement of the sub-nodes within the sub-DAG computation models allow for less idle time between processing of the sub-nodes in the newly constructed model. As before, each processing unit is assigned to a sub-node in accordance with the particular capabilities of the processing unit and the sub-task associated with the sub-node.

As shown, the first sub-DAG computation model 510 includes sub-node 2-1 504 depending on sub-node 1-1 502 and sub-node 3-1 506 depending on sub-node 2-1 504. The second sub-DAG computation model 520 includes sub-node 2-2 514 depending on sub-node 1-2 512 and sub-node 3-2 516 depending on sub-node 2-2 514. The third sub-DAG computation model 530 includes sub-node 2-3 524 depending on sub-node 1-3 522 and sub-node 3-3 526 depending on sub-node 2-3 524. And, the fourth sub-DAG computation model 540 includes sub-node 2-4 534 depending on sub-node 1-4 532 and sub-node 3-4 536 depending on sub-node 2-4 534.

Figure 7:
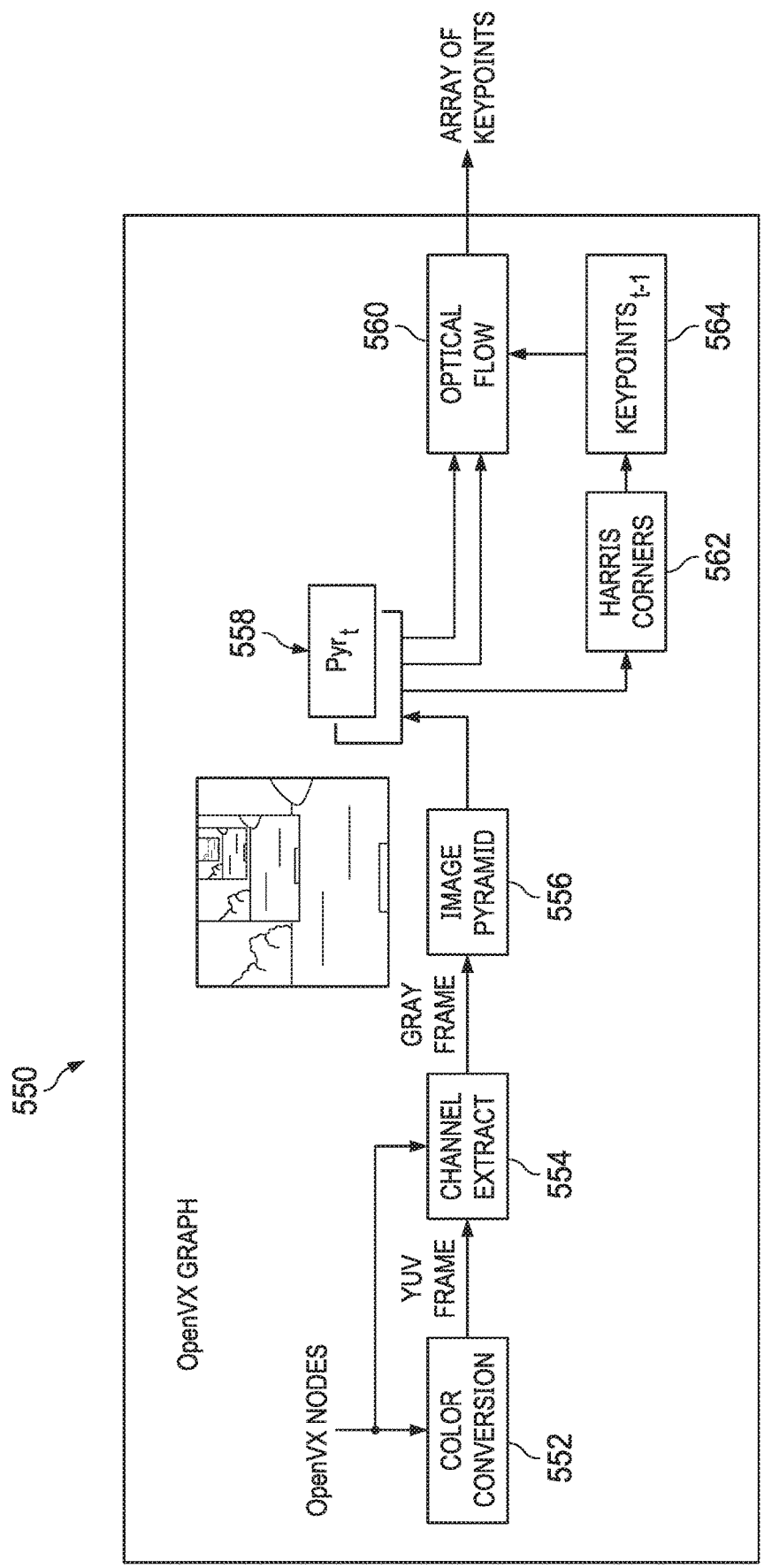
FIG. 7 is an example of a DAG computational model with multiple nodes used in a computer vision processing application.

FIG. 7 illustrates an example DAG computation model 550 used in a computer vision type of an application. An example of a computer vision type of an application is OpenVX graph. OpenVX graph is an open and royalty free standard method for cross platform acceleration of computer vision applications. An OpenVX graph includes multiple steps for end-to-end image and/or video computation. Some examples of these individual steps are color conversion, channel extraction, image pyramid, optical flow, etc.

Each step of the computer vision type of an application, such as OpenVX graph, can be represented by a DAG node. The DAG computation model 550 is an example of an OpenVX graph. The DAG computation model 550 includes a color conversion node 552, a channel extract node 554, an image pyramid node 556, a Pyramid node 558, an optical flow node 560, a Harris corners node 562, and a keypoints node 564. The understanding of the specific function of each node is not necessary to understanding the conversion of the DAG computation model 550 from a model arranged for intra-node parallel processing to a model that allows for inter-node parallel processing. The illustration is used to show that in a typical computer vision application, the computational tasks (e.g., YUV frame or Gray frame generation) may be arranged in a DAG computational model.

The embodiments of this disclosure provide methods to split each node of the DAG computation model 550 into multiple sub-tasks. Each sub-task may then be re-arranged, similar to the methods previously discussed in image processing, with sub-tasks or sub-nodes of other nodes of the DAG computation model 550 as illustrated, for example, in FIGS. 5A-C. The new sub-DAG computation models allow for inter-node processing between and within each node. As a result, the new DAG computation models allow for faster processing time and with less idle processing time of other processing units.

It should be noted that the examples mentioned-above, with respect to image processing, deep neural network, and video processing, are non-limiting examples and the corresponding discussions for splitting of an original DAG computation model and constructing new sub-DAG computation models can apply to any application that can be formed using a DAG computation model.

Figure 8:
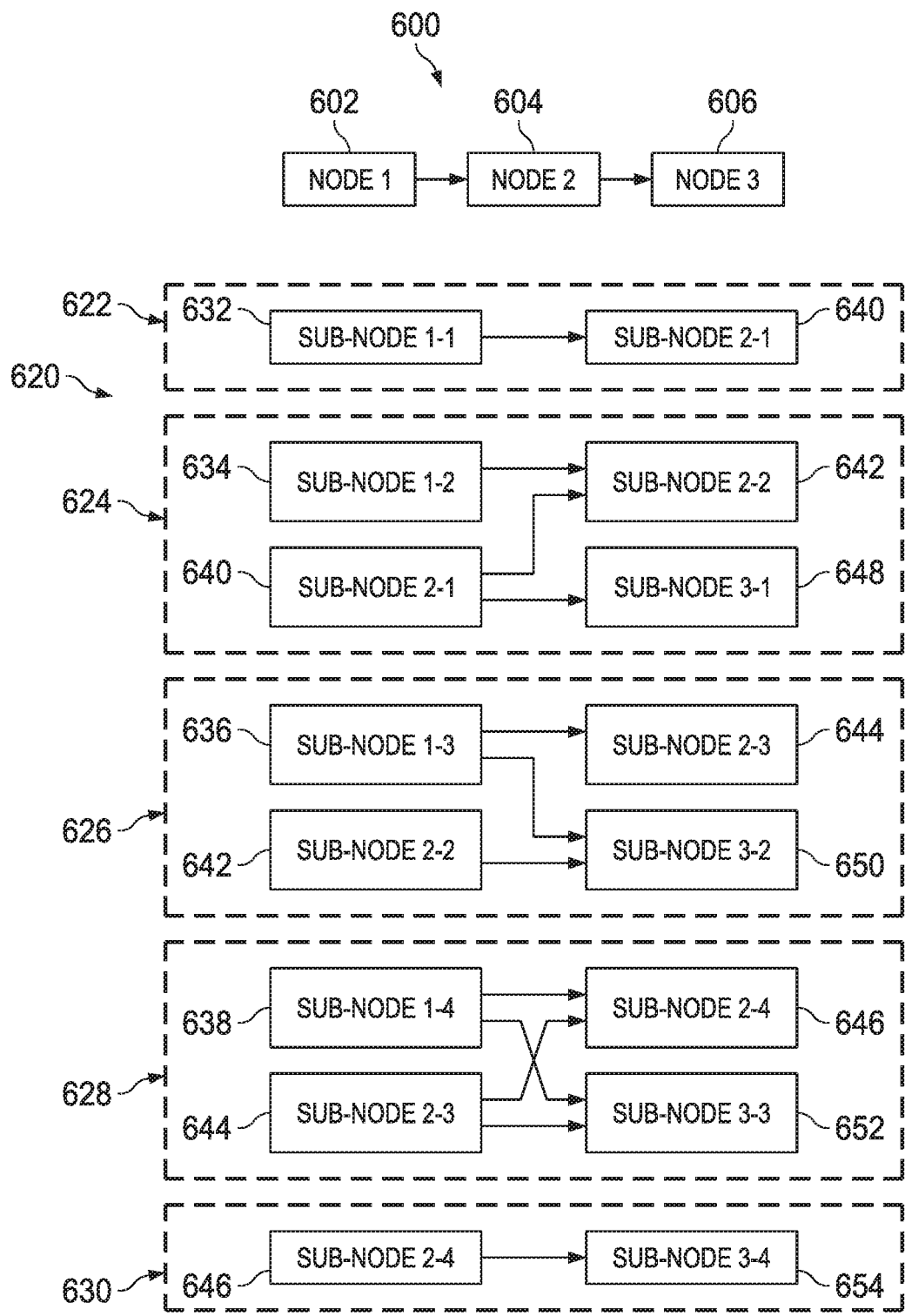
FIG. 8 is an example of a DAG computation model having a one-to-many mapping graph model.

FIG. 8 illustrates an embodiment DAG computation model 600 and a corresponding constructed embodiment DAG computation model 620 having a one-to-many mapping graph model, as may be computed by the processing system 100. In a general application, for example in image processing, video processing, or in deep neural network processing, each sub-DAG of a corresponding DAG computation model may have 2 or more sub-nodes. In this arrangement, one or more sub-nodes may depend on the input of multiple sub-nodes. And, one or more sub-nodes may provide an input for multiple sub-nodes.

The DAG computation model 600 is illustrated as having three nodes: Node 1 602, Node 2 604, and Node 3 606. It should be appreciated that a DAG computation model with greater number of nodes may also be contemplated. However, for simplicity of the discussion, three nodes are shown.

The DAG computation model 620 illustrates a splitting of each node in the DAG computation model 600 into multiple sub-nodes and construction of multiple sub-DAG computation models. Node 1 602 is split to sub-node 1-1 632, sub-node 1-2 634, sub-node 1-3 636, and sub-node 1-4 638. Node 2 604 is split to sub-node 2-1 640, sub-node 2-2 642, sub-node 2-3 644, and sub-node 2-4 646. Node 3 606 is split to sub-node 3-1 648, sub-node 3-2 650, sub-node 3-3 652, and sub-node 3-4 654.

The construction of the DAG computation model 620 and the dependency of one or more sub-nodes are illustrated as an example arrangement corresponding to a one-to-many mapping graph model in FIG. 8. As shown, sub-node 2-1 640 depends on sub-node 1-1 632. Sub-node 2-2 642 depends on inputs from sub-node 1-2 634 and sub-node 2-1 640. Sub-node 3-1 648 depends on sub-node 2-1 640. Sub-node 2-3 644 depends on sub-node 1-3 636. Sub-node 3-2 650 depends on inputs from both sub-node 1-3 636 and sub-node 2-2 642. Sub-nodes 2-4 646 and sub-node 3-3 652 each depend on inputs from both sub-node 1-4 638 and sub-node 2-3 644. Sub-node 3-4 654 depends on sub-node 2-4 646. Although the example of FIG. 8 is shown to have a variety of dependencies for each sub-node, it should be appreciated that in some embodiments the arrangement of the dependency may vary. As an example, some sub-nodes that have a single input as a dependency may have multiple dependencies. In some embodiments, the scheduling of each sub-node of the DAG computation model 600 may be performed by the CPU 102, 106, the GPU 110, or the DSP 114 processing units of the processing system 100.

Figure 9:
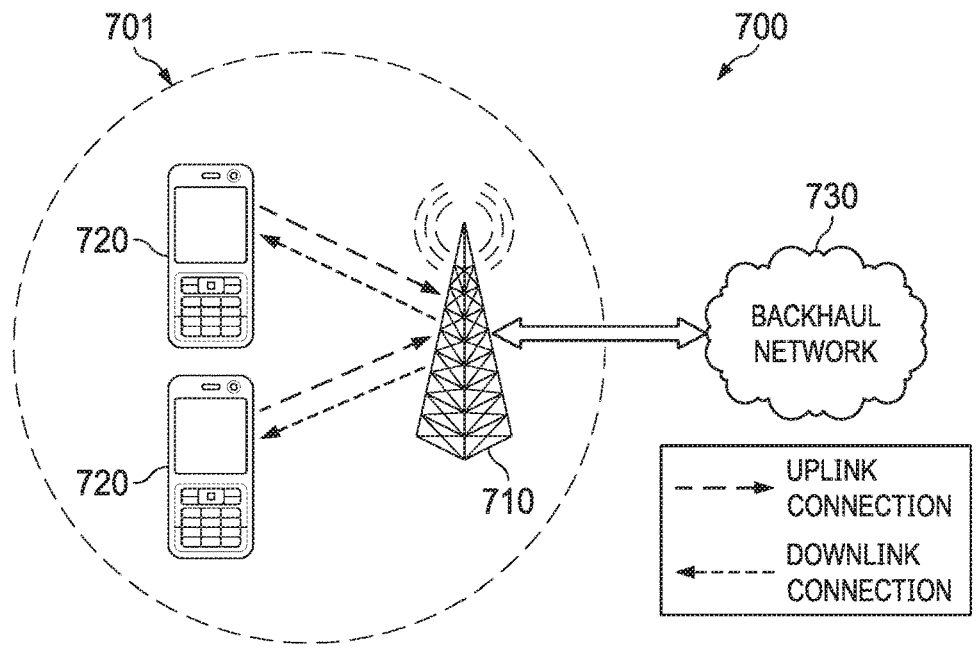
FIG. 9 is a diagram of an embodiment wireless communications network.

FIG. 9 is diagram of a network 700 for communicating data. The network 700 includes a base station 710 having a coverage area 701, a plurality of UEs 720, and a backhaul network 730. As shown, the base station 710 establishes uplink (dashed line) and/or downlink (dotted line) connections with the UEs 720, which serve to carry data from the UEs 720 to the base station 710 and vice-versa. Data communicated over the uplink/downlink connections may include data communicated between the UEs 720, as well as data communicated to/from a remote-end (not shown) by way of the backhaul network 730. As used herein, the term "base station" refers to any network-side device configured to provide wireless access to a network, such as an enhanced Node B (eNodeB or eNB), agNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 700 may include various other wireless devices, such as relays, low power nodes, etc. While it is understood that communication systems may employ multiple access nodes capable of communicating with a number of UEs, only one base station 710, and two UEs 720 are illustrated for simplicity.

Figure 10:
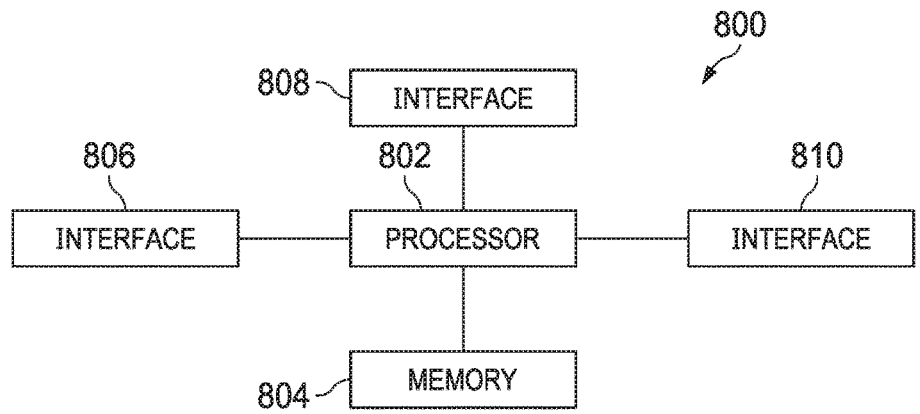
FIG. 10 is another diagram of an embodiment processing system.

FIG. 10 illustrates a block diagram of another embodiment processing system 800 for performing methods described herein, which may be installed in a host device. As shown, the processing system 800 includes a processor 802, a memory 804, and interfaces 806, 808, 810 which may (or may not) be arranged as shown in FIG. 10. The processor 802 may be any component or collection of components adapted to perform computations and/or other processing related tasks, and the memory 804 may be any component or collection of components adapted to store programming and/or instructions and associated data for execution by the processor 802. In an embodiment, the memory 804 includes a non-transitory computer readable medium. The interfaces 806, 808, 810 may be any component or collection of components that allow the processing system 800 to communicate with other devices/components and/or a user. In an embodiment, one or more of the interfaces 806, 808, 810 may be adapted to communicate data, control, or management messages from the processor 802 to applications installed on the host device and/or a remote device. As another embodiment, one or more of the interfaces 806, 808, 810 may be adapted to allow a user or user device (e.g., personal computer (PC), etc.) to interact/communicate with the processing system 800. The processing system 800 may include additional components not depicted in FIG. 10, such as long-term storage (e.g., non-volatile memory, etc.).

In some embodiments, the processing system 800 is included in a network device that is accessing, or part otherwise of, a telecommunications network. In one embodiment, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 11:
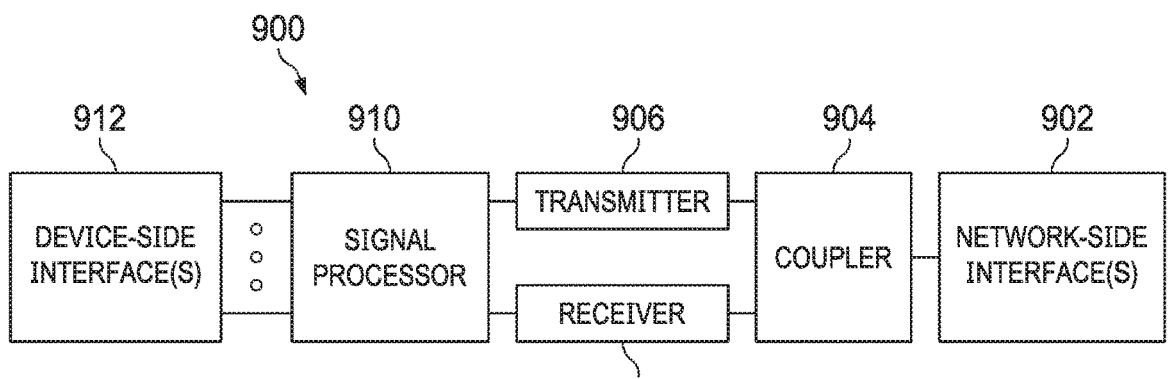
FIG. 11 is a diagram of an embodiment transceiver.

In some embodiments, one or more of the interfaces 806, 808, 810 connects the processing system 800 to a transceiver adapted to transmit and receive signaling over the telecommunications network. FIG. 11 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 1300, local area network (LAN) ports, etc.).

The transceiver 900 may transmit and receive signaling over any type of communications medium. In some embodiments, the transceiver 900 transmits and receives signaling over a wireless medium. In some embodiments, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. In some embodiments, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for processing a directed acyclic graph (DAG) computation, comprising:
    splitting, by a plurality of processors, each node of a plurality of nodes that can be split in the DAG computation into a corresponding plurality of non-interdependent sub-nodes within the each respective node, the plurality of processors comprising a multi-core graphics processing unit (GPU) and a multi-core central processing unit (CPU), the splitting comprising:
        splitting a first node of the DAG computation into a first plurality of non-interdependent sub-nodes within the first node; and
        splitting a second node of the DAG computation into a second plurality of non-interdependent sub-nodes within the second node;
    constructing, by the plurality of processors, a plurality of sub-DAG computations, each sub-DAG computation comprising at least a non-interdependent sub-node from different nodes of the DAG computation,
        wherein the plurality of sub-DAG computations includes a first sub-DAG computation and a second sub-DAG computation,
        wherein the first sub-DAG computation includes a first non-interdependent sub-node from the first plurality of non-interdependent sub-nodes and a second non-interdependent sub-node form the second plurality of non-interdependent sub-nodes,
        wherein the second sub-DAG computation includes a third non-interdependent sub-node from the first plurality of non-interdependent sub-nodes and a fourth non-interdependent sub-node from the second plurality of non-interdependent sub-nodes, and
        wherein the second node depends on the first node;
    scheduling, by the plurality of processors, a processing of each of the plurality of sub-DAG computations; and
    processing, by the plurality of processors, each of the plurality of sub-DAG computations in parallel.

2. The method as in claim 1, further comprising:
    allocating, by the plurality of processors, an intermediate shared memory for the plurality of sub-DAG computations.

3. The method as in claim 1, further comprising:
    scheduling, by the plurality of processors, a processing of each sub-node of each sub-DAG computation.

4. The method as in claim 1, wherein the scheduling the processing of each of the plurality of sub-DAG computations is in accordance with a task type of a respective sub-node of each sub-DAG computation.

5. The method as in claim 1, wherein the DAG computation comprises an image processing, a video processing, or a deep neural network processing application.

6. The method as in claim 1, wherein a completion of a processing of a sub-node in a respective sub-DAG computation is a dependency of a processing of a next sub-node in the respective sub-DAG computation.

7. The method as in claim 1, wherein a processing of a non-interdependent sub-node within a respective node is independent of a processing of another non-interdependent sub-node within a same respective node.

8. The method as in claim 1, wherein the constructing is done manually or automatically by a compiler executed by the plurality of processors.

9. The method as in claim 1, further comprising:
    receiving an input for the DAG computation.

10. The method as in claim 1, further comprising:
    outputting: an output data buffer, an output image buffer, an output image file, or an output feature of the DAG computation.

11. The method as in claim 1, wherein the splitting is in accordance with a task type associated with each node and a memory capability of the plurality of processors.

12. The method as in claim 1, wherein the splitting comprises uniform non-interdependent sub-nodes.

13. The method as in claim 1, wherein the splitting comprises non-uniform non-interdependent sub-nodes.

14. The method as in claim 1, wherein the splitting comprises boundary overlapping non-interdependent sub-nodes.

15. The method as in claim 1, wherein each sub-node is a sub-task associated with a respective node of the DAG computation.

16. The method as in claim 1, wherein one or more nodes of the DAG computation are split hierarchically.

17. The method as in claim 1, wherein one or more sub-nodes of one or more sub-DAG computations depend on a plurality of sub-node outputs.

18. The method as in claim 1, wherein an output of a first sub-node of a sub-DAG computation is an input to a second sub-node of the sub-DAG computation.

19. The method as in claim 1, wherein the second non-interdependent sub-node depends on the first non-interdependent sub-node, and wherein the fourth non-interdependent sub-node depends on the third non-interdependent sub-node, the processing comprising:
  processing the first non-interdependent sub-node by the multi-core GPU and the third non-interdependent sub-node but the multi-core CPU in parallel with processing the second non-interdependent sub-node by the multi-core GPU and the fourth non-interdependent sub-node by the multi-core CPU.

20. A device for processing a directed acyclic graph (DAG) computation, comprising:
  a non-transitory memory storage comprising instructions; and
  a plurality of processors comprising a first processing unit and a second processing unit, the first processing unit and the second processing unit being a different processor type, the plurality of processors in communication with the non-transitory memory storage, wherein the plurality of processors execute the instructions to perform operations including:
    splitting each node of a plurality of nodes that can be split in the DAG computation into a corresponding plurality of non-interdependent sub-nodes within the each node, the splitting comprising:
      splitting a first node of the DAG computation into a first plurality of non-interdependent sub-nodes within the first node; and
      splitting a second node of the DAG computation into a second plurality of non-interdependent sub-nodes within the second node;
    constructing a plurality of sub-DAG computation, each sub-DAG computation comprising at least a non-interdependent sub-node from different nodes of the DAG computation,
      wherein the plurality of sub-DAG computations includes a first sub-DAG computation and a second sub-DAG computation,
      wherein the first sub-DAG computation includes a first non-interdependent sub-node from the first plurality of non-interdependent sub-nodes and a second non-interdependent sub-node form the second plurality of non-interdependent sub-nodes,
      wherein the second sub-DAG computation includes a third non-interdependent sub-node form the first plurality of non-interdependent sub-nodes and a fourth non-interdependent sub-node form the second plurality of non-interdependent sub-nodes, and
      where the second node depends on the first node;
    scheduling a processing of each of the plurality of sub-DAG computations; and
    process each of the plurality of sub-DAG computations in parallel.

21. The device as in claim 20, the operations further comprising:
  allocating an intermediate shared memory for the plurality of sub-DAG computations.

22. The device as in claim 20, the operations further comprising:
  scheduling a processing of each sub-node of each sub-DAG computation.

23. The device as in claim 20, wherein the scheduling the processing of each of the plurality of sub-DAG computations is in accordance with a task type of a respective sub-node of each sub-DAG computation.

24. The device as in claim 20, wherein the DAG computation comprises an image processing, a video processing, or a deep neural network processing application.

25. The device as in claim 20, wherein a completion of a processing of a sub-node in a respective sub-DAG computation is a dependency of a processing of a next sub-node in the respective sub-DAG computation.

26. The device as in claim 20, wherein a processing of a non-interdependent sub-node within a respective node is independent of a processing of another non-interdependent sub-node within a same respective node.

27. The device as in claim 20, wherein the constructing is done manually or automatically by a compiler executed by the plurality of processors.

28. The device as in claim 20, wherein the operations further comprising:
  receiving an input for the DAG computation.

29. The device as in claim 20, the operations further comprising:
  outputting an output data buffer, an output image buffer, an output image file, or an output feature of the DAG computation.

30. The device as in claim 20, wherein the splitting is in accordance with a task type associated with each node and a memory capability of the plurality of processors.

31. The device as in claim 20, wherein the splitting comprises uniform non-interdependent sub-nodes.

32. The device as in claim 20, wherein the splitting comprises non-uniform non-interdependent sub-nodes.

33. The device as in claim 20, wherein the splitting comprises boundary overlapping non-interdependent sub-nodes.

34. The device as in claim 20, wherein each sub-node is a sub-task associated with a respective node of the DAG computation.

35. The device as in claim 20, wherein each of the first processing unit and the second processing unit are a different processor type selected from a group consisting of a central processing unit (CPU), a graphics processing unit (GPU), a digital signal processor (DSP), an image signal processor (ISP), a video processing unit (VPU), a neural network processing unit (NPU), and a display processing unit (DPU).

36. The device as in claim 20, further comprising at least one of an interconnect bus link, a shared memory unit, a memory controller, one or more memory units, or a peripheral interconnect, or a combination thereof.

37. The device as in claim 20, wherein one or more nodes of the DAG computation are split hierarchically.

38. The device as in claim 20, wherein one or more sub-nodes of one or more sub-DAG computations depend on a plurality of sub-node outputs.

39. The device as in claim 20, wherein an output of a first sub-node of a sub-DAG computations is an input to a second sub-node of a sub-DAG computation.

* * * * *

UNITED STATES PATENT AND TRADEMARK OFFICE
CERTIFICATE OF CORRECTION

PATENT NO. : 12,197,955 B2  
APPLICATION NO. : 17/275039  
DATED : January 14, 2025  
INVENTOR(S) : Lai et al.

Page 1 of 1

It is certified that error appears in the above-identified patent and that said Letters Patent is hereby corrected as shown below:

In the Claims

In Column 21, in Claim 1, Line 48, after "each" delete "respective".

In Column 22, in Claim 1, Line 1, delete "form" and insert -- from --.

In Column 23, in Claim 19, Line 5, delete "but" and insert -- by --.

In Column 23, in Claim 20, Line 15, after "being" delete "a".

In Column 23, in Claim 20, Line 16, delete "type," and insert -- types, --.

In Column 23, in Claim 20, Line 30, delete "computation," and insert -- computations, --.

In Column 23, in Claim 20, Line 40, delete "form" and insert -- from --.

In Column 23, in Claim 20, Line 43, delete "form" and insert -- from --.

In Column 23, in Claim 20, Line 45, delete "form" and insert -- from --.

In Column 23, in Claim 20, Line 48, delete "where" and insert -- wherein --.

In Column 23, in Claim 20, Line 51, delete "process" and insert -- processing --.

In Column 24, in Claim 35, Line 42, delete "are" and insert -- is --.

In Column 24, in Claim 39, Line 58, delete "computations" and insert -- computation --.

Signed and Sealed this  
Sixteenth Day of September, 2025

Coke Morgan Stewart  
*Acting Director of the United States Patent and Trademark Office*